United States Patent
Li et al.

(10) Patent No.: US 11,703,716 B2
(45) Date of Patent: Jul. 18, 2023

(54) DISPLAY APPARATUS

(71) Applicant: Hisense Visual Technology Co., Ltd., Shandong (CN)

(72) Inventors: Fulin Li, Shandong (CN); Nannan Zhang, Shandong (CN); Mingsheng Qiao, Shandong (CN); Xiaowei Liu, Shandong (CN); Xiao Li, Shandong (CN); Jinlong Li, Shandong (CN); Weidong Liu, Shandong (CN); Yushuai Zhai, Shandong (CN)

(73) Assignee: Hisense Visual Technology Co., Ltd., Shandong (CN)

( * ) Notice: Subject to any disclaimer, the term of this patent is extended or adjusted under 35 U.S.C. 154(b) by 0 days.

(21) Appl. No.: 17/806,174

(22) Filed: Jun. 9, 2022

(65) Prior Publication Data
US 2022/0299823 A1    Sep. 22, 2022

Related U.S. Application Data

(63) Continuation of application No. PCT/CN2021/081642, filed on Mar. 18, 2021.

(30) Foreign Application Priority Data

Apr. 28, 2020 (CN) .......................... 202010351591.2
Apr. 28, 2020 (CN) .......................... 202020687645.8
(Continued)

(51) Int. Cl.
*G02F 1/13357* (2006.01)

(52) U.S. Cl.
CPC .. *G02F 1/133606* (2013.01); *G02F 1/133603* (2013.01); *G02F 1/133605* (2013.01); *G02F 1/133611* (2013.01)

(58) Field of Classification Search
CPC ......... G02F 1/133606; G02F 1/133603; G02F 1/133605; G02F 1/133611
See application file for complete search history.

(56) References Cited

U.S. PATENT DOCUMENTS

2005/0045897 A1    3/2005   Chou et al.
2008/0106905 A1*   5/2008   Zhang ............... G02F 1/133608
                                                    362/311.06
(Continued)

FOREIGN PATENT DOCUMENTS

CN    1807969 A       7/2006
CN    101000427 A     7/2007
(Continued)

OTHER PUBLICATIONS

Chinese Office Action, dated Nov. 3, 2021, from China Application No. 202010221021.1.
(Continued)

*Primary Examiner* — Evan P Dzierzynski
(74) *Attorney, Agent, or Firm* — Workman Nydegger

(57) ABSTRACT

A display apparatus includes a display panel and a backlight module. The backlight module includes: a back plate, a micro light emitting diode light board, and a diffusing plate bracket. The micro light emitting diode light board includes a plurality of through holes, the diffusing plate bracket is arranged in the through holes and fixed on the back plate via the through holes.

9 Claims, 7 Drawing Sheets

(30) Foreign Application Priority Data

May 28, 2020 (CN) .......................... 202010468356.3
Dec. 18, 2020 (CN) .......................... 202011508504.6

(56) References Cited

U.S. PATENT DOCUMENTS

| | | | | |
|---|---|---|---|---|
| 2009/0129058 A1* | 5/2009 | Tokita | ............... | G02F 1/133611 362/97.1 |
| 2009/0154139 A1* | 6/2009 | Shin | ................. | G02F 1/133608 362/382 |
| 2012/0262631 A1* | 10/2012 | Kuromizu | ......... | G02F 1/133608 362/602 |
| 2013/0010230 A1 | 1/2013 | Matsuki et al. | | |
| 2013/0135539 A1* | 5/2013 | Kamata | ............. | G02F 1/133603 348/790 |
| 2015/0221831 A1* | 8/2015 | Kim | ................. | G02F 1/133605 257/98 |
| 2017/0167703 A1* | 6/2017 | Cok | ....................... | H05B 45/10 |
| 2017/0322361 A1 | 11/2017 | Park et al. | | |
| 2018/0113248 A1* | 4/2018 | Park | ...................... | G02B 6/009 |
| 2018/0259166 A1 | 9/2018 | Min | | |
| 2018/0356684 A1* | 12/2018 | Chang | ............... | G02F 1/133603 |
| 2018/0374828 A1 | 12/2018 | Liao et al. | | |
| 2020/0159073 A1 | 5/2020 | Kyoukane et al. | | |

FOREIGN PATENT DOCUMENTS

| | | |
|---|---|---|
| CN | 101281321 A | 10/2008 |
| CN | 101416323 A | 4/2009 |
| CN | 101440925 A | 5/2009 |
| CN | 101529323 A | 9/2009 |
| CN | 101666943 A | 3/2010 |
| CN | 101713888 A | 5/2010 |
| CN | 101782203 A | 7/2010 |
| CN | 102478178 A | 5/2012 |
| CN | 102478187 A | 5/2012 |
| CN | 102650383 A | 8/2012 |
| CN | 102694106 A | 9/2012 |
| CN | 102884365 A | 1/2013 |
| CN | 203431608 U | 2/2014 |
| CN | 104285196 A | 1/2015 |
| CN | 106782128 A | 5/2017 |
| CN | 206555836 U | 10/2017 |
| CN | 108107630 A | 6/2018 |
| CN | 108303822 A | 7/2018 |
| CN | 207743251 U | 8/2018 |
| CN | 108490685 A | 9/2018 |
| CN | 108549178 A | 9/2018 |
| CN | 208014703 U | 10/2018 |
| CN | 108828841 A | 11/2018 |
| CN | 208431721 U | 1/2019 |
| CN | 109557721 A | 4/2019 |
| CN | 109638120 A | 4/2019 |
| CN | 109920902 A | 6/2019 |
| CN | 110398857 A | 11/2019 |
| CN | 110456574 A | 11/2019 |
| CN | 110543049 A | 12/2019 |
| CN | 110824766 A | 2/2020 |
| CN | 110908181 A | 3/2020 |
| CN | 110908185 A | 3/2020 |
| CN | 110908188 A | 3/2020 |
| CN | 110928038 A | 3/2020 |
| CN | 210166600 U | 3/2020 |
| CN | 210294751 U | 4/2020 |
| CN | 210294762 U | 4/2020 |
| CN | 210723020 U | 6/2020 |
| CN | 210835515 U | 6/2020 |
| CN | 111399280 A | 7/2020 |
| CN | 210982988 U | 7/2020 |
| CN | 210982989 U | 7/2020 |
| CN | 210982990 U | 7/2020 |
| CN | 211826819 U | 10/2020 |
| CN | 211979375 U | 11/2020 |
| CN | 112882282 A | 6/2021 |
| CN | 113126363 A | 7/2021 |
| CN | 113270437 A | 8/2021 |
| CN | 113777826 A | 12/2021 |
| EP | 0735952 A1 | 10/1996 |
| JP | H05235413 A | 9/1993 |
| JP | 2010272418 A | 12/2010 |
| JP | 2011233395 A | 11/2011 |
| JP | 2011243563 A | 12/2011 |
| JP | 2013143273 A | 7/2013 |
| JP | 2018106971 A | 7/2018 |
| JP | 2018207048 A | 12/2018 |
| KR | 20070002144 A | 1/2007 |
| TW | I255896 B | 6/2006 |
| WO | 2013064369 A1 | 5/2013 |

OTHER PUBLICATIONS

Chinese Office Action, dated Apr. 25, 2022, from China Application No. 202010522067.7.

Chinese Office Action, dated Apr. 6, 2022, from China Application No. 202010522571.7.

Chinese Office Action, dated Apr. 21, 2022, from China Application No. 202010570713.7.

Chinese Office Action, dated Jun. 22, 2022, from China Application No. 202010756556.9.

Chinese Office Action, dated Oct. 19, 2022, from China Application No. 202010756556.9.

Chinese Office Action, dated Aug. 5, 2022, from China Application No. 202010791424.X.

Chinese Office Action, dated Jun. 17, 2022, from China Application No. 202010791451.7.

Chinese Office Action, dated Jul. 14, 2022, from China Application No. 202010855892.9.

Chinese Second Office Action, dated Sep. 29, 2022, from China Application No. 202010855892.9.

Chinese Office Action, dated Oct. 27, 2022, from China Application No. 202011182703.2.

International Search Report, dated Jul. 1, 2021, from PCT Application No. PCT/CN2021/081640.

International Search Report, dated Jun. 23, 2021, from PCT/CN2021/081642 filed Mar. 18, 2021.

* cited by examiner

US 11,703,716 B2

DISPLAY APPARATUS

CROSS REFERENCE TO RELATED APPLICATIONS

This application is a continuation of International Application No. PCT/CN2021/081642, filed on Mar. 18, 2021, which claims priorities to Chinese Patent Application No. 202010351591.2, filed on Apr. 28, 2020, Chinese Patent Application No. 202020687645.8, filed on Apr. 28, 2020, Chinese Patent Application No. 202010468356.3, filed on May 28, 2020, and Chinese Patent Application No. 202011508504.6, filed on Dec. 18, 2020. The entire contents of these applications are incorporated herein by reference.

FIELD

The present application relates to the field of displays, in particular to a display apparatus.

BACKGROUND

As a current mainstream panel, a liquid crystal display screen has the advantages of low power consumption, small size, and low radiation. A liquid crystal panel is not self-lit panel and needs to work with a backlight module.

A micro light emitting diode as backlight has attracted a lot of attention in a liquid crystal display technology. The chip size used in the micro light emitting diode is in a micrometer level, such as a mini light emitting diode (mini LED). Unlike a liquid crystal display which uses edge-lit light guide plate in backlight module, the micro light emitting diode uses a large number of mini LEDs as a backlight source. In this way, thinning of the backlight can be realized, more refined dynamic control can be achieved, and dynamic contrast of the liquid crystal display can be improved.

In a direct type backlight module, it is often necessary to arrange a certain space between a light source and a diffusing plate to ensure sufficient light mixing between light sources. Since a form of the mini LED as the backlight source is different from a form of a common light bar, there is a need to design the support of the diffusing plate.

SUMMARY

Embodiments of the present disclosure provide a display apparatus.

The display apparatus includes: a display panel, configured for displaying an image; and a backlight module, arranged on a side of the display panel, and configured to provide backlight for the display panel; wherein the backlight module includes: a back plate, having a support function; a micro light emitting diode light board, arranged on a side of the back plate and configured to be a backlight source; wherein the micro light emitting diode light board includes a plurality of micro light emitting diodes and a plurality of through holes; and a diffusing plate bracket, configured to be placed in plurality of the through holes, and fixed on the back plate via the plurality of through holes.

In some embodiments, the micro light emitting diode light board includes: a base substrate, arranged on the back plate; a line layer, arranged on a side of the base substrate away from the back plate, and configured to provide a driving signal; the plurality of micro light emitting diodes, arranged on the line layer; a reflective layer, arranged on a side of the line layer close to the plurality of micro light emitting diodes, wherein the reflective layer includes a plurality of openings configured to expose the plurality of micro light emitting diodes, one opening of the plurality of openings is used to expose one micro light emitting diode of the plurality of micro light emitting diodes; and a packaging layer, arranged on a plurality of surfaces corresponding to the plurality of micro light emitting diodes, and configured to protect the plurality of micro light emitting diodes, wherein the packaging layer includes a dot pattern in one-to-one correspondence to the plurality of micro light emitting diodes; wherein the through holes is configured to penetrate through the base substrate, the line layer and the reflective layer.

In some embodiments, the through holes are arranged at areas between two adjacent micro light emitting diodes.

In some embodiments, the through holes are arranged at central areas of a quadrangle formed by four adjacent micro light emitting diodes, wherein each two of the four adjacent micro light emitting diodes are adjacent.

In some embodiments, a shape of a through hole is circular or square.

In some embodiments, a material of the base substrate is glass.

In some embodiments, a material of the reflective layer is white ink.

In some embodiments, a thickness of the white ink is configured to be from 20 μm to 50 μm.

In some embodiments, a size of a micro light emitting diode of the plurality of micro light emitting diodes is smaller than 1 mm.

In some embodiments, the backlight module further includes: a diffusing plate, arranged on a side of the micro light emitting diode light board away from the back plate, wherein the diffusing plate bracket is configured to support the diffusing plate; and an optical film, arranged on a side of the diffusing plate away from the micro light emitting diode light board.

Embodiments of the present disclosure provide another display apparatus, including: a display panel, configured for displaying an image; a micro light emitting diode light board, serving as a backlight source, wherein the micro light emitting diode light board is arranged on a light entering side of the display panel; a diffusing plate, arranged on a light emitting light of the micro light emitting diode light board; and a support component, arranged on a surface of the diffusing plate facing the micro light emitting diode light board, and configured to support the diffusing plate to achieve a preset distance between the diffusing plate and the micro light emitting diode light board.

Embodiments of the present disclosure provide a further display apparatus, including: a display panel, configured for displaying an image; and a backlight module, arranged on a light entering side of the display panel, and configured to provide backlight for the display panel; wherein the backlight module includes: a base substrate, having a bearing function; a driving line layer, arranged on the base substrate and configured to provide a driving signal, wherein the driving line layer includes a through hole penetrating through the driving line layer and an exposed connecting electrode; a supporting pillar, fixed in the through hole; a micro light emitting diode, electrically connected with the connecting electrode; and a diffusing plate, arranged on the supporting pillar.

Figure 1:
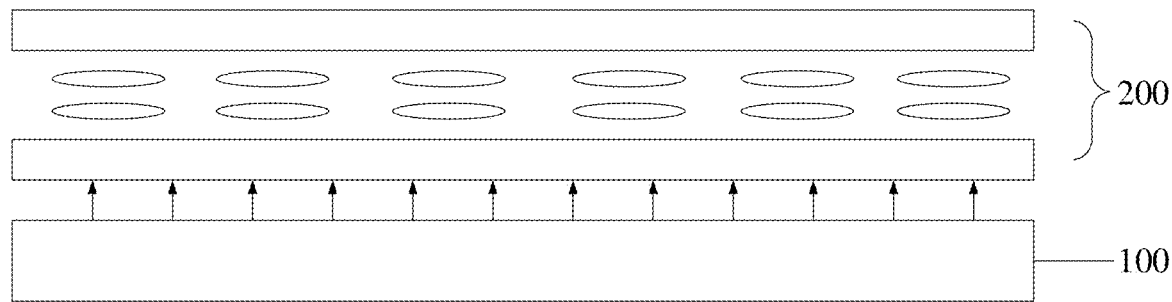
FIG. 1 is a schematic sectional diagram of a display apparatus according to an embodiment of the present application.

100—backlight module; 200—display panel; 11, 21—back plate; 12, 22—micro light emitting diode light board; 13, 23—diffusing plate; 14, 25—support component; 15, 26—optical film; 24—transparent substrate; 121, 221—circuit board; 122, 222—micro light emitting diode; 123, 223—reflective layer; and 124, 224—packaging layer.

DETAILED DESCRIPTION OF THE EMBODIMENTS

In order to make the above objectives, features and advantages of the present application more easy to understand, the present application will be further described below with reference to the accompanying drawings and embodiments. Exemplary embodiments, however, can be embodied in various forms and should not be construed as limitation to the embodiments set forth herein. The same reference numerals in the drawings denote the same or similar structures, and thus repeated descriptions on them will be omitted. The terms for describing positions and directions in the present application are all discussed by taking the accompanying drawings as an example, but changes can also be made according to needs, and the changes are all included in the protection scope of the present application. The drawings in the present application are only used to illustrate relative positional relationships and do not indicate proportional products.

A liquid crystal display apparatus mainly includes a backlight module and a liquid crystal display panel. The liquid crystal display panel itself does not emit light, and relies on a light source provided by the backlight module for brightness display.

A work principle of the liquid crystal display apparatus is that liquid crystal is placed between two pieces of conductive glass, and by driving an electric field between two electrodes, electric field distortion effect of liquid crystal molecules is created, so as to control the transmission or shielding function of a backlight source, thereby displaying an image. If a color filter is added, color images are displayed.

FIG. 1 is a schematic sectional diagram of a display apparatus according to an embodiment of the present application.

Referring to FIG. 1, the display apparatus includes: a backlight module 100 and a display panel 200. The backlight module 100 is configured to provide a backlight source for the display panel 200, and the display panel 200 is configured for displaying an image.

The backlight module 100 is usually arranged at a bottom of the display apparatus, and a shape and size thereof are compatible with a shape and size of the display apparatus. When applied to the fields of televisions or mobile terminals, the backlight module usually adopts a rectangular shape.

The backlight module in the embodiments of the present application is a direct type backlight module, and is configured to evenly emit light on an entire light emitting surface, so that sufficiently bright and evenly distributed light is provided for the display panel and the display panel may normally display an image.

The display panel 200 is arranged on a light emitting side of the backlight module 100, and a shape and size of the display panel is usually matched with the backlight module. In general, the display panel 200 may be set to be rectangular, including an upper side, a lower side, a left side and the right side. The upper side is opposite to the lower side, the left side is opposite to the right side, the upper side is respectively connected one end of the left side and one end of the right side, and the lower side is respectively connected the other end of the left side and the other end of the right side.

The display panel 200 is a transmission type display panel and can modulate a transmission rate of the light, but it does not emit light itself. The display panel 200 has a plurality of pixel units arranged in an array, and each pixel unit may independently control transmittance and color of light from the backlight module 100 entering the pixel unit, so that the light transmitting through all the pixel units constitute an image displayed.

Figure 2:
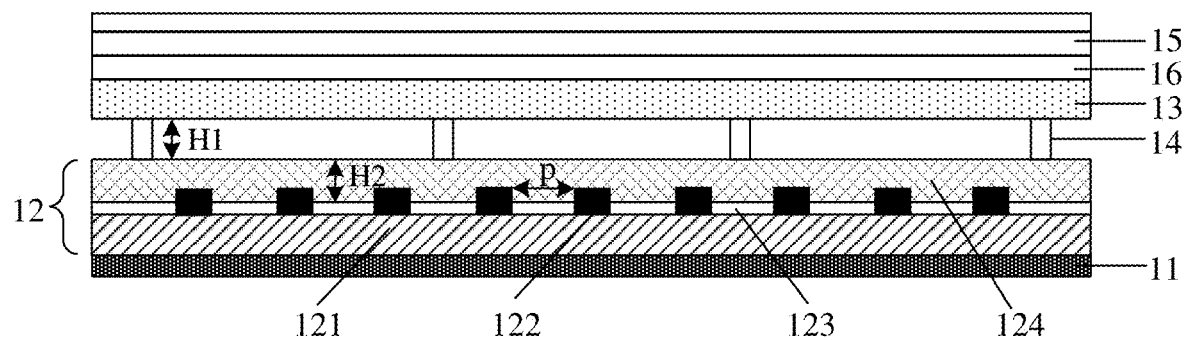
FIG. 2 is a first schematic sectional diagram of a backlight module according to an embodiment of the present application.

FIG. 2 is a first schematic sectional diagram of a backlight module according to an embodiment of the present application.

Referring to FIG. 2, in a light emitting direction of the light in the backlight module, the backlight module includes: a back plate 11, a micro light emitting diode light board 12, a diffusing plate 13, one or more support components 14 and an optical film 15 in order.

The micro light emitting diode light board may be formed by surface mounted technology including a package on board (POB) and a chip on board (COB). POB refers to packaging an LED chip (large size bonding pad) before mounting the LED chip to a circuit board; and COB refers to directly mounting the LED chip to the circuit board.

Both the above mounting manners are applicable to the micro light emitting diode light board in the present application.

The following discussion will take the micro light emitting diode light board being a structure formed by a COB packaging as an example.

In some embodiments, the micro light emitting diode light board 12 is a mini LED light board.

The back plate 11 is arranged at a bottom of the backlight module and has support functions. The back plate 11 is generally a square structure. When the back plate is applied to abnormal shape display apparatus, a shape of the back plate adapts to a shape of the display apparatus. The back plate 11 includes an upper side, a lower side, a left side and the right side. The upper side is opposite to the lower side, the left side is opposite to the right side, the upper side is respectively connected one end of the left side and one end of the right side, and the lower side is respectively connected the other end of the left side and the other end of the right side.

A material of the back plate 11 includes aluminum, iron, aluminum alloy, or iron alloy. The back plate 11 is configured to fix the micro light emitting diode light board 12 as well as to support and fix edge areas of the optical film, the diffusing plate or other components. The back plate 11 further has a heat dissipation function on the micro light emitting diode light board 12.

In the embodiments of the present application, the backlight module is the direct type backlight module, and the micro light emitting diode light board 12 is arranged on the back plate 11. In general, the micro light emitting diode light board 12 may be square or rectangular as a whole, with a length ranging from 200 mm to 800 mm and a width ranging from 100 mm to 500 mm.

A plurality of micro light emitting diode light boards 12 may be arranged according to a size of the display apparatus, and the micro light emitting diode light boards 12 usually provide backlight through a splicing manner. In order to avoid an optical problem caused by splicing the micro light emitting diode light boards 12, a gap between adjacent micro light emitting diode light boards 12 is made as small as possible, or even seamless splicing is achieved.

As a backlight source, the micro light emitting diode light board 12, compared with a traditional light emitting diode, has a smaller size, may realize finer dynamic control, and increases dynamic contrast of the display apparatus.

The micro light emitting diode light board 12 includes: a circuit board 121, micro light emitting diodes 122, a reflective layer 123 and a packaging layer 124.

The circuit board 121 is arranged on the back plate 11, and a shape of the circuit board 121 is the same as an overall shape of the micro light emitting diode light board 12. In general, the circuit board 121 is in a plate shape, and is rectangular or square as a whole. A length of the circuit board 121 ranges from 200 mm to 800 mm, and a width of the circuit board 121 ranges from 100 mm to 500 mm.

In the embodiments of the present application, the circuit board 121 may be a printed circuit board (PCB). The PCB includes an electronic circuit and an insulating layer. The insulating layer exposes a bonding pad for welding with the micro light emitting diode in the electronic circuit and covers a remaining part.

Alternatively, the circuit board 121 may also be an array substrate formed by manufacturing a thin film transistor driving circuit on a base substrate. A surface of the array substrate has an electrode which is connected with the thin film transistor driving circuit and is configured to be welded with the micro light emitting diode.

A base substrate or a substrate of the circuit board 121 may be made of materials such as FR4 or glass. Alternatively, the base substrate or the substrate of the circuit board 121 may be made of a flexible material to form a flexible display apparatus.

The circuit board 121 is configured to provide driving electrical signals for the micro light emitting diodes 122. The micro light emitting diodes 122 and the circuit board 121 are independently manufactured respectively. A surface of the circuit board 121 includes a plurality of bonding pads configured to be welded to the micro light emitting diodes 122. The micro light emitting diodes 122 are transferred to upper sides of the bonding pads after being manufactured. The micro light emitting diodes 122 are welded to the circuit board 121 through processes such as reflow soldering, so that the micro light emitting diodes 122 may be controlled to emit light by controlling an input signal of the circuit board 121.

The micro light emitting diodes 122 are arranged on the circuit board. Electrodes of the micro light emitting diodes 122 are welded to the bonding pads of the circuit board 121 so as to realize electrical connection between them.

The micro light emitting diodes 122 are not like common light emitting diodes, and specifically refer to micro light emitting diode chips without packaging support. The micro light emitting diodes 122 are very small in size, which is conducive to controlling dynamic light emission of the backlight module to smaller divisions and improving contrast of a screen. In the embodiments of the present application, the size of the micro light emitting diodes 122 is smaller than 500 μm.

The micro light emitting diode light board may include micro light emitting diodes 122 of only one color, or may include micro light emitting diodes of multiple colors, which is not limited herein.

The reflective layer 123 is arranged on a surface of the circuit board 121 close to the micro light emitting diodes 122. A shape of the reflective layer 123 is the substantially same as that of the circuit board 121, and the reflective layer 123 includes a plurality of openings configured to expose the micro light emitting diodes 122.

The reflective layer 123 is a protective layer arranged on the circuit board, and has functions of protecting the circuit board and achieving diffuse reflection of the emitting light. In the embodiments of the present application, through use of white oil or other materials with a reflective property, the reflective layer 123 may coat the surface of the circuit board 121, and then areas of the bonding pads configured for welding with the micro light emitting diodes 122 are then exposed through processes such as etching.

The reflective layer 123 has a property of reflecting light, so when light emitting from the micro light emitting diode light board 12 is reflected by an element in the backlight module to a side of the back plate, the light may be reflected by the reflective layer 123 to a light emitting side, thereby improving use efficiency of a light source.

The packaging layer 124 is arranged on surfaces of the micro light emitting diodes 122 facing away from the circuit board 121. The packaging layer 124 may be spaced individually, or may be arranged as a whole layer. In case of individual arrangement, the packaging layers 124 only cover the surfaces of the micro light emitting diodes 122, and are not arranged in any other regions of the circuit board; and in case of being arranged as a whole layer, the packaging layer 124 covers the entire circuit board 121 and the surfaces of the micro light emitting diodes 122.

The packaging layer 124 is configured to protect the micro light emitting diodes 122 and to prevent foreign items from entering into insides of the micro light emitting diodes 122. In the embodiments of the present application, the packaging layer 124 may adopt a transparent colloid material, such as silicon gel or epoxy resin.

The diffusing plate 13 is arranged on a light emitting side of the micro light emitting diode light board 12. A shape of the diffusing plate 13 is substantially same as a shape of the micro light emitting diode light board 12. In general, the diffusing plate 13 may be configured to be rectangular or square. A thickness of the diffusing plate 13 ranges from 1.5 mm to 3 mm.

A function of the diffusing plate 13 is to diffuse the emitting light and make the light passing the diffusing plate 13 more uniform. A scattered particle material is arranged in the diffusing plate 13, and the light entering the scattered particle material will be continuously refracted and reflected, so that an effect of diffusing the light is achieved and light is made more uniform.

The diffusing plate usually has a large haze, with a better light uniform effect. It may usually be processed by an extrusion technology. A material of the diffusing plate is usually selected from at least one of polymethyl methacrylate (PMMA), polycarbonate (PC), a polystyrene series material (PS), or polypropylene (PP).

In practical implementations, there is a certain distance between the backlight source and the diffusing plate, to ensure that sufficient light mixing is achieved among different light sources, thereby ensuring brightness evenness of the backlight module.

In general, the diffusing plate is fixed on the back plate 11 by a bracket, the bracket of the diffusing plate is provided with a buckle and a limiting element, and the bracket is fixed on the back plate 11 by making a hole on the back plate 11.

In the embodiments of the present application, the micro light emitting diode light board 12 is adopted as the backlight source, and the micro light emitting diode light board 12 is laid on the entire back plate 11. If a traditional bracket manner is adopted to support the diffusing plate 13, the micro light emitting diode light board 12 needs to design holes and the bracket then penetrates holes in the light board to be fixed on the back plate 11.

However, spacing between the micro light emitting diodes 122 on the micro light emitting diode light board 12 is relatively small, usually smaller than 10 mm, so making holes on the micro light emitting diode light board 12 may easily damage the micro light emitting diodes and cause damage to the lamp. Moreover, if the base substrate of the micro light emitting diode light board 12 is made of materials such as glass, the holes may easily break the base substrate.

In view of this, referring to FIG. 2, in the embodiment of the present application, one or more support component 14 are arranged on a surface of the diffusing plate 13 facing the micro light emitting diode light board 12. The support component 14 has a certain height and may support the diffusing plate 13 when the diffusing plate 13 is installed on the light emitting side of the micro light emitting diode light board 12, so that a preset distance is achieved between the micro light emitting diode light board 12 and the diffusing plate 13. Therefore, sufficient color mixing may be achieved among the micro light emitting diodes 122 in the micro light emitting diode light board 12, and evenness of light emission of the backlight module is improved.

The support component 14 may be manufactured by using a transparent colloid material such as silicon gel or epoxy resin. The support component 14 may be formed on the surface of the diffusing plate 13 by dispersing or coating glue.

By using the transparent colloid material to manufacture the support component 14, the light emitted from the micro light emitting diode light board 12 will not be blocked, and at the same time, the transparent colloid has certain elasticity, so when the diffusing plate 13 is installed, the support component 14 will not damage a surface structure of the micro light emitting diode light board 12.

The backlight module further includes a wavelength conversion layer such as a quantum dot layer 16, and an optical film 15.

The quantum dot layer 16 is arranged on a side of the diffusing plate 13 facing away from the micro light emitting diode light board 12. The quantum dot layer 16 is arranged as a whole layer, and a shape of the quantum dot layer 16 is substantially same as that of the micro light emitting diode light board 12, which may be designed to be rectangular or square in general.

The quantum dot layer 16 is matched with monochromatic micro light emitting diodes in application. In the embodiment of the present application, the micro light emitting diodes are blue light micro light emitting diodes. The quantum dot layer 16 has two quantum dot materials, including a red quantum dot material, whose wavelength of light excited by blue light is about 620 nm-640 nm; and a green quantum dot material, whose wavelength of light excited by blue light is about 520 nm-540 nm. Red light and green light emitted by the quantum dot layer 16 under excitement are mixed with transmitted blue light into white light, thereby providing backlight for the display panel.

The optical film 15 is arranged on the side of the diffusing plate 13 facing away from the micro light emitting diode light board 12. The optical film 15 is arranged as a whole layer, and a shape of the optical film 15 is substantially same as that of the micro light emitting diode light board 12, which may be designed to be rectangular or square in general.

Through the arrangement of the optical film 15, the backlight module may adapt to various practical applications.

When the micro light emitting diodes 122 in the micro light emitting diode light board 12 are the blue light micro light emitting diodes, the optical film 15 includes a quantum dot layer or a fluorescent layer.

The quantum dot layer includes a red quantum dot material and a green quantum dot material. The red quantum dot material emits red light when being excited by blue light, the green quantum dot material emits green light when being excited by blue light, and the red light and green light emitted under excitement are mixed with transmitted blue light into white light to be emitted.

The fluorescent layer includes fluorescent materials emitting red light under excitement and emitting green light under excitement, and the red light and green light emitted under excitement are mixed with transmitted blue light into white light to be emitted.

In addition, the optical film 15 may further include a prismatic lens. The prismatic lens may change an emitting angle of light, so a view angle of the display apparatus is changed.

The optical film 15 may further include a reflective polarizer. The reflective polarizer, serving as a film for enhancing light brightness may increase a brightness of the backlight module, increase use efficiency of the light, and make the emitting light have polarizing properties, so a polarizer used under the liquid crystal display panel is omitted.

Referring to FIG. 2, in the embodiment of the present application, the packaging layer 124 covers the surfaces of the circuit board 121 and the micro light emitting diodes 122 as a whole layer. In this case, the packaging layer 124 packages the micro light emitting diodes 122 in a whole-layer coating manner, and the packaging manner of whole-layer coating has a relatively high packaging efficiency.

Figure 3:
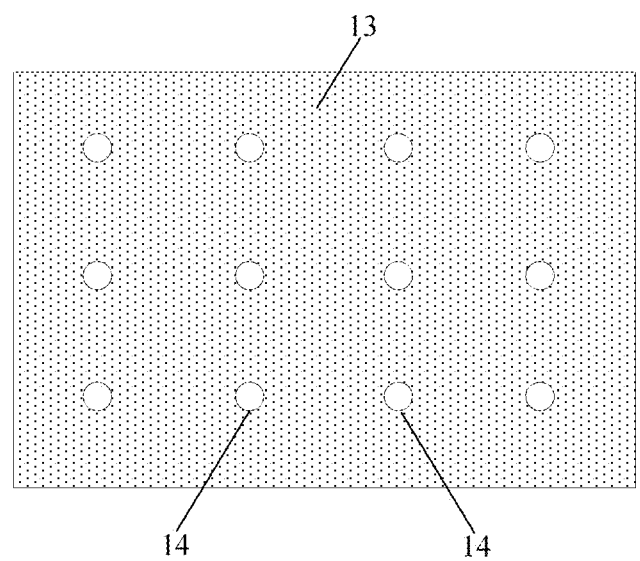
FIG. 3 is an upward view of a diffusing plate in the backlight module shown in FIG. 2.

FIG. 3 is an upward view of a diffusing plate in the backlight module shown in FIG. 2.

Referring to FIG. 2, when the micro light emitting diode light board 12 packages the micro light emitting diodes 122 by a manner of coating packaging glue as a whole layer, the surface of the micro light emitting diode light board 12 is a plane, and the support component 14 arranged on the diffusing plate 13 is a dotted convex structure dispersed on the surface of the diffusing plate 13.

The support component 14 with the dotted convex structure may be formed by dispersing a transparent colloid material on the surface of the diffusing plate 13.

In the embodiment of the present application, the support component 14 having the dotted convex structure is arranged at spaced areas among the micro light emitting diodes 122, thereby avoiding a situation that when the support component 14 is directly arranged at tops of the micro light emitting diodes 122, the light emitting from the micro light emitting diodes 122 is blocked and brightness of the micro light emitting diodes 122 is affected.

In the embodiment of the present application, a height of the support component 14 having the dotted convex structure is smaller than 6 mm. An excessively large height of the support component 14 will affect an overall thickness of the backlight module, which does not meet the light and thin design requirements of the micro light emitting diode light board.

The height of the support component 14 may be designed according to combination of the optical film in the backlight module, the haze and a thickness of the diffusing plate 13 and other requirements. A ratio H/p of a light mixing distance to a spacing between two adjacent micro light emitting diodes may normally reflect a complete thickness of the backlight module as well as quantity of the micro light emitting diodes used in the backlight module. A smaller value of H/p indicates a smaller light mixing distance and a thinner design of the backlight module; and larger spacing between two adjacent micro light emitting diodes indicates a smaller quantity of micro light emitting diodes to be used, which reduces the cost.

In the embodiments of the present application, a height of a support component 14 and a thickness of a packaging layer 124 satisfy the following formula:

$$0.2 \leqslant (H1+H2)/p \leqslant 0.8.$$

Referring to FIG. 2, H1 represents the height of the support component 14, H2 represents the thickness of the packaging layer 124, and p represents a spacing between two adjacent micro light emitting diodes 122.

A light mixing distance refers to a perpendicular distance from the micro light emitting diodes 122 to the diffusing plate 13. In the embodiments of the present application, the packaging layer 124 is further arranged on the micro light emitting diodes 122, and a distance between the diffusing plate 13 and the micro light emitting diode light board 12 is the height of the support component 14. Therefore, a sum of the thickness H2 of the packaging layer 124 and the height H1 of the support component 14 may reflect the light mixing distance, while a ratio of the light mixing distance to the spacing between two adjacent micro light emitting diodes may reflect an overall thickness of the backlight module and the quantity of the micro light emitting diodes used in the backlight module. By setting $0.2 \leqslant (H1+H2)/p \leqslant 0.8$, design requirements of various backlight modules may be met.

If the light mixing distance needs to be relatively large, the height of the support component 14 may be increased correspondingly on the premise that structures of other elements of the backlight module are not changed. If the light mixing distance needs to be relatively small, the height of the support component 14 may be reduced correspondingly on the premise that structures of other elements of the backlight module are not changed. In this way, flexible setting of a value of (H1+H2)/p of the backlight module may be realized.

Figure 4:
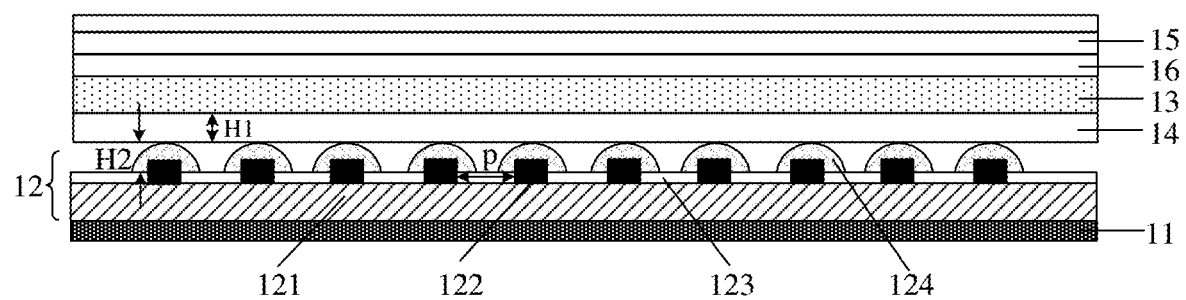
FIG. 4 is a second schematic sectional diagram of a backlight module according to an embodiment of the present application.
Figure 5:
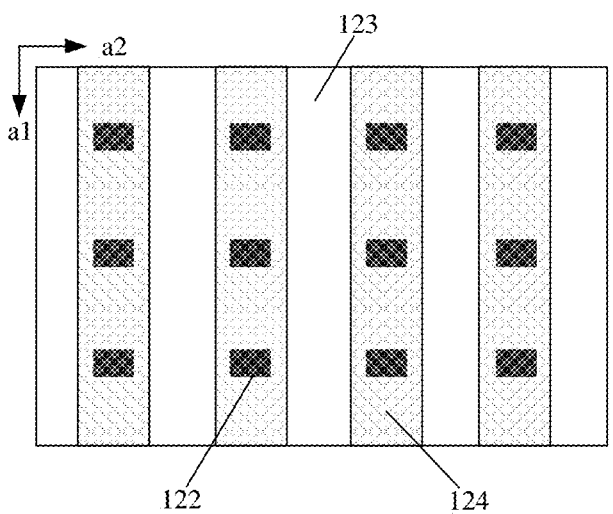
FIG. 5 is a top view of a micro light emitting diode light board in the backlight module shown in FIG. 4.
Figure 6:
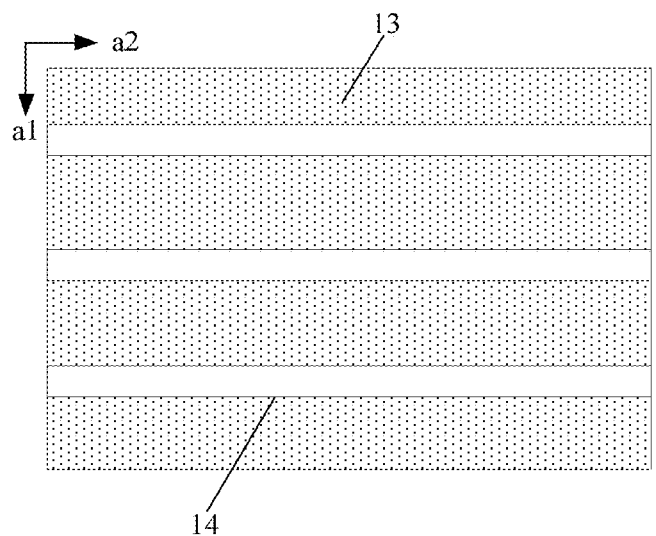
FIG. 6 is an upward view of a diffusing plate in the backlight module shown in FIG. 4.

FIG. 4 is a second schematic sectional diagram of a backlight module according to an embodiment of the present application. FIG. 5 is a top view of a micro light emitting diode light board in the backlight module shown in FIG. 4. FIG. 6 is an upward view of a diffusing plate in the backlight module shown in FIG. 4.

In another embodiment of the present application, referring to FIG. 4 and FIG. 5, the micro light emitting diodes 122 are arranged into multiple rows on the circuit board along a first direction a1. The packaging layer 124 is not manufactured by coating as a whole layer. Instead, the packaging layer 124 covers the micro light emitting diodes 122 row by row along the first direction a1, so the packaging layer 124 forms a plurality of strip-shaped patterns on the circuit board and each strip-shaped pattern covers one row of micro light emitting diodes 122.

A manufacturing method by coating glue row by row has a relatively high packaging efficiency, and meanwhile the amount of the packaging glue may also be used less, which allows for reducing the cost.

Referring to FIG. 4 and FIG. 6, when the micro light emitting diode light board 12 is packaged by the above packaging manner, the surface of the micro light emitting diode light board 12 includes a plurality of strip-shaped convex structures. In the embodiment of the present application, the support component 14 may be designed to be a strip-shaped convex structure extending in a second direction a2. The first direction a1 is perpendicular to the second direction a2.

When the transparent colloid material coats the surface of the diffusing plate 13 row by row, the support component 14 of the above strip-shaped convex structure may be formed. By manufacturing the support component 14 via coating row by row, a relatively high production efficiency is achieved.

The extending direction of the support component 14 of the strip-shaped convex structure is perpendicular to the extending direction of the packaging layer 124 of the strip-shaped convex structure, and the two may form a stable crossed structure when in contact with each other, so that when the diffusing plate 13 is mounted at a top of the micro light emitting diode light board 12, a stable supporting function is achieved on the diffusing plate 13.

In the embodiments of the present application, the support component 14 having the dotted convex structure is arranged at the spaced areas among the micro light emitting diodes 122, i.e. formed at a spaced area between every two micro light emitting diodes, thereby avoiding the situation that when the support component 14 is directly arranged at the tops of the micro light emitting diodes 122, the light emitting from the micro light emitting diodes 122 is blocked and the brightness of the micro light emitting diodes 122 is affected.

In the embodiments of the present application, the height of the support component 14 having the dotted convex structure is smaller than 6 mm. An excessively large height of the support component 14 will affect an overall thickness of the backlight module, which does not meet the light and thin design requirements of the micro light emitting diode light board.

The height of the support component 14 may be designed according to combination of the optical film in the backlight module, the haze and the thickness of the diffusing plate 13 and other requirements.

In the embodiments of the present application, a height of the support component 14 and a thickness of an packaging layer 124 satisfy the following formula:

$$0.2 \leq (H1+H2)/p \leq 0.8.$$

Referring to FIG. 4, H1 represents the height of the support component 14, H2 represents the thickness of the packaging layer 124, and p represents a spacing between two adjacent micro light emitting diodes.

In the embodiments of the present application, the packaging layer 124 is further arranged on the micro light emitting diodes 122, and a distance between the diffusing plate 13 and the micro light emitting diode light board 12 is the height of the support component 14. Therefore, the sum of the thickness H2 of the packaging layer 124 and the height H1 of the support component 14 may reflect the light mixing distance, while the ratio of the light mixing distance to the spacing between two adjacent micro light emitting diodes may reflect the overall thickness of the backlight module and the quantity of the micro light emitting diodes used in the backlight module. By setting $0.2 \leq (H1+H2)/p \leq 0.8$, design requirements of various backlight modules may be met.

Figure 7:
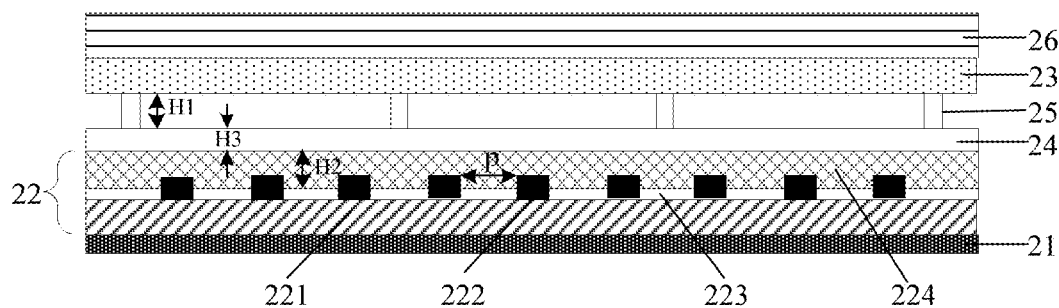
FIG. 7 is a third schematic sectional diagram of a backlight module according to an embodiment of the present application.

FIG. 7 is a third schematic sectional diagram of a backlight module according to an embodiment of the present application.

In another embodiment of the present application, referring to FIG. 7, in a light emitting direction of light in the backlight module, the backlight module sequentially includes: a back plate 21, a micro light emitting diode light board 22, a diffusing plate 23, and an optical film 26.

The micro light emitting diode light board 22 includes: a circuit board 221, micro light emitting diodes 222, a reflective layer 223, and a packaging layer 224.

The above structure in the backlight module is substantially same as the structure of the backlight module according to the above embodiment of the present application, and repeated description will omit here.

The above backlight module according to the embodiment of the present application further includes: a transparent substrate 24, arranged between the micro light emitting diode light board 22 and the diffusing plate 23. A shape of the transparent substrate 24 is substantially same as a shape of the micro light emitting diode light board 22, which may be designed to be rectangular or square in general.

A material of the transparent substrate 24 may be an acrylic plate, and a thickness of the transparent substrate 24 ranges from 1 mm to 3 mm.

Figure 8:
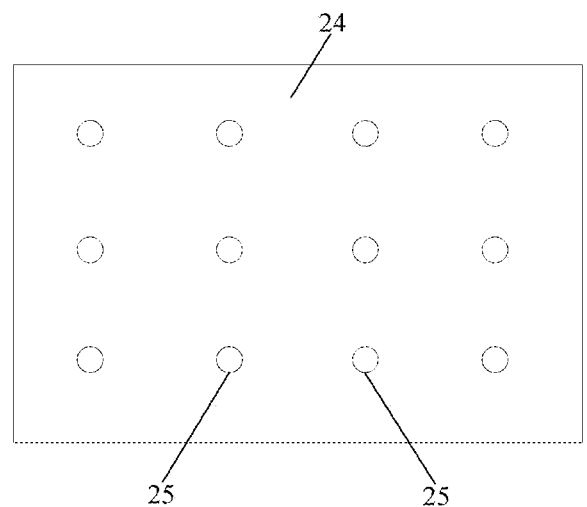
FIG. 8 is a top view of a transparent substrate in the backlight module shown in FIG. 7.

FIG. 8 is a top view of a transparent substrate in the backlight module shown in FIG. 7.

Referring to FIG. 7 and FIG. 8, a support component 25 is arranged on a surface of the transparent substrate 24 facing the diffusing plate 23. The support component 25 has a certain height, the transparent substrate 24 carrying the support component 25 is mounted at a top of the micro light emitting diode light board 22 before the diffusing plate 23 is mounted, and then the diffusing plate 23 may be supported when the diffusing plate 23 is mounted, so that a preset distance is realized between the micro light emitting diode light board 22 and the diffusing plate 23. Therefore, sufficient color mixing may be achieved among the micro light emitting diodes 222 in the micro light emitting diode light board 22, and evenness of light emission of the backlight module is improved.

The support component 25 may be manufactured by using a transparent colloid material such as silicon gel or epoxy resin. The support component 25 may be formed on the surface of the transparent substrate 24 by using dispersing or coating glue.

The support component 25 is arranged on a side of the transparent substrate 24 facing away from the micro light emitting diode light board 22, so when the support component 25 is mounted, a surface structure of the micro light emitting diode light board 22 will not be damaged.

Referring to FIG. 8, a surface of the transparent substrate 24 is a flat surface, and the support component 25 arranged on the transparent substrate 24 is a dotted convex structure dispersed on the surface of the transparent substrate 24.

The support component 25 with the dotted convex structure may be formed by dispersing a transparent colloid material on the surface of the transparent substrate 24.

In the embodiment of the present application, the support component 25 having the dotted convex structure is arranged at spacing areas among the micro light emitting diodes 222, thereby avoiding a situation that when the support component 25 is directly arranged at tops of the micro light emitting diodes 222, the light emitting from the micro light emitting diodes 222 is blocked and brightness of the micro light emitting diodes 222 is affected.

In the embodiment of the present application, a height of the support component 25 having the dotted convex structure is smaller than 6 mm. An excessively large height of the support component 25 will affect an overall thickness of the backlight module, which does not meet the light and thin design requirements of the micro light emitting diode light board.

The height of the support component 25 may be designed according to combination of the optical film in the backlight module, the haze and a thickness of the diffusing plate 23 and other requirements.

In the embodiment of the present application, a height of a support component 25, a thickness of a transparent substrate 24 and a thickness of a packaging layer 224 satisfy the following formula:

$$0.2 \leq (H1+H2+H3)/p \leq 0.8.$$

Referring to FIG. 7, H1 represents the height of the support component 25, H2 represents the thickness of the packaging layer 224, H3 represents the thickness of the transparent base substrate 24, and p represents a spacing between two adjacent micro light emitting diodes 222.

A light mixing distance refers to a perpendicular distance from the micro light emitting diodes 222 to the diffusing plate 23. In the embodiments of the present application, the packaging layer 224 is further arranged on the micro light emitting diodes 222, the transparent substrate 24 is arranged on the packaging layer 224, and a distance between the transparent substrate 24 and the diffusing plate 23 is the height of the support component 25. Therefore, a sum of the thickness H2 of the packaging layer 224, the thickness H3 of the transparent substrate 24 and the height H1 of the support component 25 may reflect the light mixing distance, while a ratio of the light mixing distance to the spacing between two adjacent micro light emitting diodes may reflect the overall thickness of the backlight module and the quantity of the micro light emitting diodes used in the backlight module. By setting $0.2 \leqslant (H1+H2+H3)/p \leqslant 0.8$, design requirements of various backlight modules may be met.

If the light mixing distance needs to be relatively large, the height of the support component 25 may be increased correspondingly on the premise that structures of other elements of the backlight module are not changed. If the light mixing distance needs to be relatively small, the height of the support component 25 may be reduced correspondingly on the premise that structures of other elements of the backlight module are not changed. In this way, flexible setting of a value of $(H1+H2+H3)/p$ of the backlight module may be realized.

The following discussion will take the micro light emitting diode light board manufactured by POB packaging as an example.

The micro light emitting diode light board includes the circuit board as well as micro light emitting diodes 122' arranged on the circuit board. The micro light emitting diodes 122' are devices packaged with micro light emitting diode chips 1221'. A specific structure is shown in FIG. 9.

Figure 9:
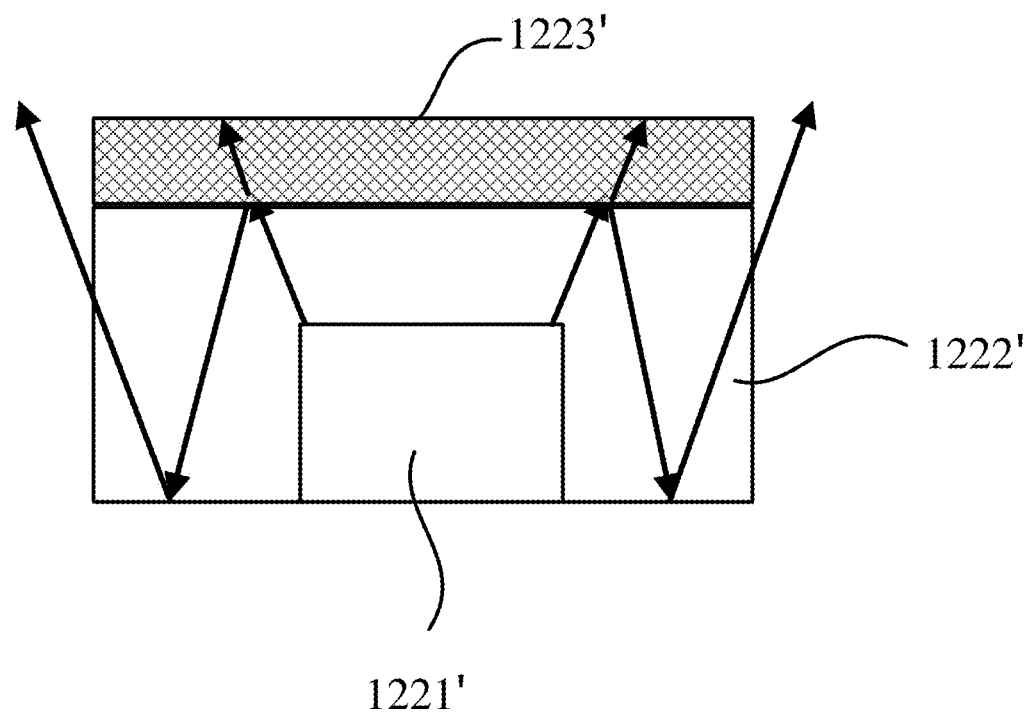
FIG. 9 is a schematic structural diagram of a micro light emitting diode according to an embodiment of the present application.

As shown in FIG. 9, each micro light emitting diode 122' includes a micro light emitting diode chip 1221', and a separated packaging bracket 1222', where the micro light emitting diode chip 1221' is placed at a bottom of the packaging bracket 1222'.

In order to further lower an OD value, each micro light emitting diode 122' further includes a top shielding layer 1223' arranged on a light emitting side of the corresponding micro light emitting diode chip 1221'.

The top shielding layers 1223' are specifically formed by mixing scattered particles in glue. The top shielding layers 1223' allows for increasing light emitting angles of the micro light emitting diode chips 1221'. Therefore, under a circumstance that the quantity of the micro light emitting diodes 122' and spacing among them are kept unchanged, an emitting range of the micro light emitting diodes 122' is increased, and the OD value is further reduced.

When the micro light emitting diode light board in the embodiment is used, it usually needs to work with a reflector to serve as a reflection layer together.

Regarding how to realize support for a diffusing plate, the present application further provides a backlight module.

Figure 10:
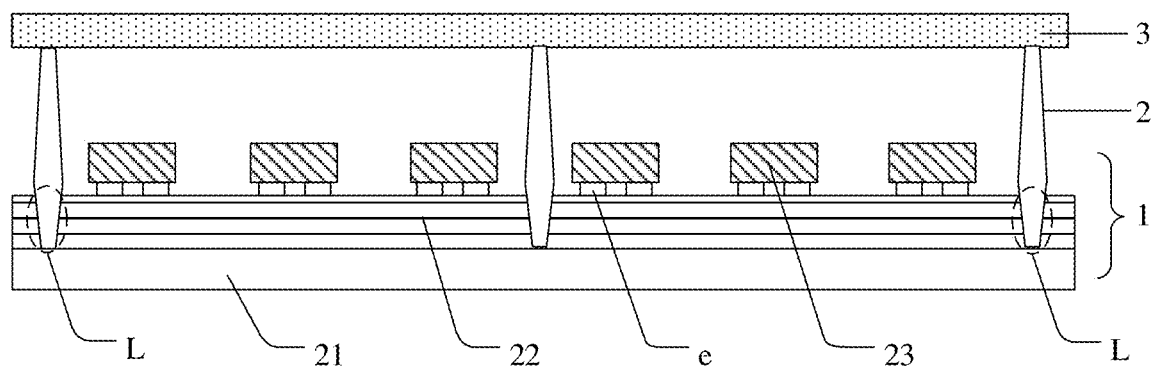
FIG. 10 is a schematic sectional diagram of a backlight module according to an embodiment of the present application.

FIG. 10 is a schematic sectional diagram of a backlight module according to an embodiment of the present application.

Referring to FIG. 10, the backlight module includes: a micro light emitting diode light board 1, a supporting pillar 2 configured to support a diffusing plate, and a diffusing plate 3 arranged on a light emitting side of the micro light emitting diode light board 1.

A micro light emitting diode is a design for thinning, miniaturizing and arraying a light emitting diode. The micro light emitting diode has the same properties of high efficiency and low energy consumption as the light emitting diode, and at the same time has a smaller size. As a backlight source, the micro light emitting diode light board 1, compared with a traditional light emitting diode, has a smaller size, may realize finer dynamic control, and increases dynamic contrast of a display apparatus.

The micro light emitting diode light board 1 in the embodiment of the present application may be passively driven or actively driven. An active driving mode has the advantages of low power consumption, crosstalk resistance, and low driving cost. In addition, an active-driven micro light emitting diode light board may also be manufactured by a thin-film process.

Referring to FIG. 10, the micro light emitting diode light board 1 includes: a base substrate 21, a driving line layer 22 arranged on the base substrate, and micro light emitting diodes 23 electrically connected with the driving line layer 22.

The base substrate 21 is arranged at a bottom of the display apparatus and has a bearing function. A shape of the base substrate 21 is rectangular or square, including an upper side, a lower side, a left side and the right side. The upper side is opposite to the lower side, the left side is opposite to the right side, the upper side is respectively connected one end of the left side and one end of the right side, and the lower side is respectively connected the other end of the left side and the other end of the right side.

A size of the base substrate 21 adapts to a size of the display apparatus. In general, the size of the base substrate is slightly smaller than the size of the display apparatus.

The base substrate 21 adopts a material such as glass. Before manufacturing, the glass needs to be cleaned and dried.

The driving line layer 22 is arranged on the base substrate 21. The driving line layer 22 includes a driving element configured to drive the micro light emitting diodes to emit light and a signal line. In the embodiment of the present application, the driving line layer 22 is manufactured by a Thin Film Transistor (TFT) manufacturing process.

The driving line layer 22 includes a plurality of metal layers and an insulating layer. The metal layers and the insulating layer are patterned to form a circuit including driving elements including a thin film transistor, a capacitor and a resistor which have certain connection relationships with one another. After the driving line layer 22 is electrically connected with the micro light emitting diodes 23, the driving line layer 22 may provide driving signals for the micro light emitting diodes 23 to control the micro light emitting diodes 23 to emit light.

Referring to FIG. 10, the driving line layer 22 in the embodiment of the present application includes a through hole L penetrating through all film layers in the driving line layer and exposed connecting electrodes e. The through hole L is configured to fix the supporting pillar for supporting the diffusing plate, and the connecting electrodes e are configured to be electrically connected with the micro light emitting diodes 23.

The connecting electrodes e are bonding pads exposed on an array substrate, and the micro light emitting diodes 23 are usually welded to the connecting electrodes e, thereby realizing electrical connection between them.

The micro light emitting diodes 23 are not like conventional light emitting diodes, and specifically refer to micro light emitting diode chips. The micro light emitting diodes 23 are very small in size, which allows for controlling dynamic light emission of the backlight module to smaller divisions and improving contrast of a screen. In the embodiment of the present application, the size of the micro light emitting diodes 23 is smaller than 500 μm.

The micro light emitting diode light board 1 may include micro light emitting diodes 23 of only one color, or may include micro light emitting diodes 23 of multiple colors, which is not limited here.

The diffusing plate 3 is arranged on the supporting pillar 2. The diffusing plate 3 is arranged on the light emitting side of the micro light emitting diode light board 1. A shape of the diffusing plate 3 is substantially same as the shape of the micro light emitting diode light board 1. The diffusing plate 3 may be designed to be rectangular or square in general. A thickness of the diffusing plate 3 ranges from 1.5 mm to 3 mm.

The diffusing plate 3 is able to scatter emergent light and make the light passing the diffusing plate 3 evener. A scattered particle material is arranged in the diffusing plate 3, and the light entering the scattered particle material will be continuously refracted and reflected, so that an effect of diffusing the light is achieved and the light is made more uniform.

The diffusing plate 3 usually has a large haze, so a light uniform effect is more obvious. It may usually be processed by an extrusion technology. A material of the diffusing plate 3 is usually selected from at least one of polymethyl methacrylate (PMMA), polycarbonate (PC), a polystyrene series material (PS), and polypropylene (PP).

In practical application, a certain distance needs to be arranged between the micro light emitting diode light board 1 and the diffusing plate 3, to ensure that sufficient light mixing is achieved among the micro light emitting diodes 23, thereby ensuring brightness evenness of the backlight module.

In general, the diffusing plate 3 is fixed on a back plate of the backlight module by a bracket, the bracket of the diffusing plate is provided with a buckle and a limiting element, the micro light emitting diode light board 1 needs to be punched, and then the bracket penetrates through the through hole to be fixed on the back plate. Of course, when the above array base substrate according to the embodiment of the present application is adopted as the micro light emitting diode light board, the base substrate is usually a glass substrate, so a punching process is complicated and cost is high. If the bracket of the diffusing plate is directly attached to the surface of the micro light emitting diode light board 1, the bracket is prone to sliding and has relatively poor stability.

In view of this, in the embodiment of the present application, the through hole L is arranged on the driving line layer 22 of the micro light emitting diode light board 1. The through hole L serves as a fixing position for mounting the supporting pillar which supports the diffusing plate 3. The supporting pillar 2 is directly mounted in the through hole L, then the supporting pillar 2 is fixed, and then the diffusing plate 3 is arranged on the supporting pillar 2.

The through hole L in the driving line layer 22 may be formed by the same pattern process as film layers in the driving line layer 22, and cost and process difficulty will not be increased. Because the supporting pillar 2 is fixed in the through hole L, the base substrate is prevented from being punched. In the meantime, a position of the through hole L is fixed, so by inserting the supporting pillar 2 into the through hole L, relative movement of the supporting pillar 2 may be avoided, thereby improving stability of a supporting structure.

Figure 11:
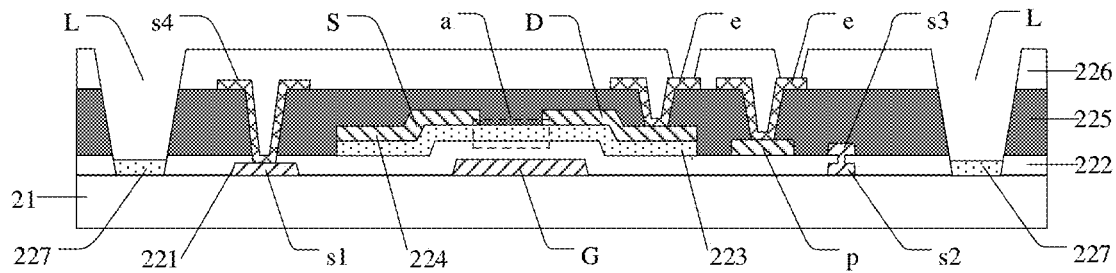
FIG. 11 is a schematic sectional diagram of a micro light emitting diode light board according to an embodiment of the present application.

FIG. 11 is a schematic sectional diagram of a micro light emitting diode light board according to an embodiment of the present application.

Referring to FIG. 11, in the embodiment of the present application, the driving line layer includes: a gate metal layer 221, a gate insulating layer 222, a source layer 223, a source-drain metal layer 224, a flat layer 225 and a reflective layer 226.

The gate metal layer 221 is arranged on the base substrate 21. The gate metal layer has a pattern including a gate G and gratings patterns.

The gate metal layer 221 may adopt a single layer or multiple layers of metal including Au, Ag, Cu, Ni, Pt, Al, Mo or Cr, or may adopt a metal layer of Al:Nd alloy or a Mo:W alloy.

The pattern of the gate metal layer 221 may be formed by a one-time pattern process.

The gate insulating layer 222 is arranged on a surface of a side of the gate metal layer 221 facing away from the base substrate 21. The gate insulating layer 222 is configured to insulate the gate metal layer 221, so that other metal layers may be formed on the gate insulating layer 222.

The gate insulating layer 222 may be an inorganic layer of silicon oxide, silicon nitride, or metal oxide, and may include a single layer or multiple layers.

In the embodiment of the present application, referring to FIG. 10, the gate insulating layer 222 has a via hole configured to form the above through hole L. The via hole may be formed by the one-time pattern process together with other patterns of the gate insulating layer.

The source layer 223 is arranged on a surface of a side of the gate insulating layer 222 facing away from the gate metal layer 221. The source layer 223 includes a source region and a drain region formed by doping N-type impurity ions or P-type impurity ions. A region between the source region and the drain region is an undoped channel region a.

The source layer 223 may be made of materials such as amorphous silicon or polycrystalline silicon, and the polycrystalline silicon may be formed through crystallization of the amorphous silicon.

The source-drain metal layer 224 is arranged on a surface of the source layer 223 facing away from the gate insulating layer 222. The source-drain metal layer 224 has a pattern including a source S, a drain D, a data line and a pin p.

The source-drain metal layer 224 may adopt a single layer or multiple layers of metal including Au, Ag, Cu, or Al, or may adopt a metal layer of Al:Cu alloy.

The patterns of the source layer 223 and the source-drain metal layer 224 may be formed by a one-time pattern process.

The above gate G, the source layer, the source S and the drain D constitute a thin film transistor. The embodiments of the present application only discuss by taking a bottom gate type thin film transistor as an example. During specific application, the thin film transistor may also be manufactured into a top gate structure, and the source layer 223 of the top gate structure is arranged on a bottom side of the gate metal layer 221.

The flat layers 225 are arranged on the surfaces of the sides of the source layer 223 and the source-drain metal layer 224 facing away from the gate insulating layer 222. The flat layers 225 are configured to insulate the source layer 223 and the source-drain metal layer 224 and to flatten the surfaces of the film layers at the same time, which allows for forming other devices on the flat layers 225.

The flat layers 225 may be made of materials such as resin. Patterns of via holes configured to form the through holes L in the flat layers 225 as well as via holes configured to expose the drain D and the pin p in the source-drain metal layer are formed by a one-time pattern process.

The connecting electrodes e are arranged on a surface of the corresponding flat layer 225 facing away from the source-drain metal layer 224, and the connecting electrodes e are electrically connected with the drain D and the pin p through the via holes of the flat layers 225.

The connecting electrodes e serve as bonding pads welded with the micro light emitting diodes, and may be manufactured by a transparent conductive material. The connecting electrodes e are only formed at areas where the micro light emitting diodes need to be welded, and two connecting electrodes e connecting the same micro light emitting diode do not contact with each other.

Patterns of the connecting electrodes e are formed by a one-time pattern process.

The reflective layer 226 is arranged on the surface of the side of the flat layer 225 facing away from the source-drain metal layer 224. The reflective layer 226 includes openings for exposing the connecting electrodes e.

The reflective layer 226 is a protective layer arranged on the driving line layer, and is used for diffuse reflection of the emitting light. In the embodiment of the present application, through use of white oil or other materials with a reflective property, the reflective layer 226 may coat the surface of the driving line layer, and then areas of the connecting electrodes e configured to be welded with the micro light emitting diodes are then exposed through processes such as etching.

The reflective layer 226 has a property of reflecting light, so when light emitting from the micro light emitting diode light board is reflected by an element in the backlight module to a side of the back plate, the light may be reflected by the reflective layer 226 to a light emitting side, thereby improving use efficiency of a light source.

In the embodiment of the present application, in addition to the openings for exposing the connecting electrodes e, the reflective layer 226 further has a via hole configured to form a through hole L. The above pattern of the reflective layer 226 may be formed by a one-time pattern process.

In this way, by patterning the film layers in the driving line layer, the through hole L penetrating through the gate insulating layer 222, the flat layers 225 and the reflective layer 226. The through hole L is configured to fix the supporting pillar, so that punching holes on the base substrate is replaced by using a buckle or a screw to fix the supporting pillar.

Referring to FIG. 11, the gate metal layer 221 further includes a first signal line s1 and a second signal line s2. The first signal line s1 and the second signal line s2 are configured to transmit a detection signal or a power source signal, and are formed by a one-time pattern process together with other patterns of the gate metal layer.

The source-drain metal layer 224 further includes pins p electrically connected with the electrodes e and a third signal line s3. The drain D and the pin p of the thin film transistor are electrically connected with the two electrodes of the micro light emitting diode; and the drain D and the pin p are configured to provide a driving signal for the micro light emitting diode to control the micro light emitting diode to emit light. The third signal line s3 may also be configured to transmit power source signals and is electrically connected with the second signal line s2 in the gate metal layer 221 by the via hole of the gate insulating layer 222. Other patterns of the pin p, the third signal line s3 and the source-drain metal layer may be formed by a one-time pattern process.

A film layer where the connecting electrodes e are arranged further includes a fourth signal line s4 in addition to the connecting electrodes e. The fourth signal line s4 may be configured to transmit the detection signal, and the fourth signal line s4 is electrically connected with the first signal line s1 in the gate metal layer 221 through the via hole.

By arranging the signal lines on different metal layers and electrically connecting them through the via hole, conductivity of the signal lines may be improved, elements in a circuit may be avoided, and lengths of the signal lines may be shortened.

It can be seen from FIG. 11 that, the metal layers according to the embodiment of the present application include different elements and signal lines. In order to avoid influence on original pattern of the metal layers, in the embodiment of the present application, the through holes L are arranged in regions outside the patterns of the metal layers, and orthographic projections of the through holes L on the base substrate 21 do not overlap with orthographic projections of the gate metal layer 221, the source layer 223 and the source-drain metal layer 224 on the base substrate 21.

Therefore, it is only needed to add a pattern of the through holes L when the gate insulating layer 222, the flat layers 225 and the reflective layer 226 are being patterned, and the through holes L may be respectively formed at desirable areas by the same pattern process for the gate insulating layer 222, the flat layers 225 and the reflective layer 226.

In order increase stability of the supporting pillar 2, the through holes L may be evenly distributed in non-pattern regions of the driving line layer. In order to increase depths of the through holes L, the through holes L may penetrate through the film layers of the driving line layer, so that depths of the through holes L are substantially same as a depth of the driving line layer. In the embodiment of the present application, the depths of the through holes L may reach 3 μm-4 μm.

Referring to FIG. 11, after the driving line layer is manufactured, supporting pillars 2 may be moved into the through holes L and the supporting pillars 2 are fixed in the corresponding through holes L. In the embodiment of the present application, a bonding layer 227 may be arranged on the base substrate 21 in the through holes L, and the supporting pillars 2 are then transferred into the through holes L, so that the supporting pillars 2 are fixed on the base substrate 21 in the through holes L through the bonding layer 227.

The bonding layer 227 may be formed by dispersing, and after the supporting pillars 2 are in sufficient contact with the bonding layer, curing treatment may be performed, so as to ensure that connection between the supporting pillars 2 and the micro light emitting diode light board 1 is firmer.

A height of each supporting pillar 2 influences an overall thickness of the backlight module as well as light mixing distances of the micro light emitting diodes 23. In order to meet light and thin design requirements of the backlight module and ensure that the micro light emitting diodes have sufficient light mixing distances, the height of the supporting pillar 2 in the embodiment of the present application is smaller than 6 mm.

A specific height of the supporting pillar 2 may be designed according to combination of an optical film in the backlight module, a haze and a thickness of the diffusing plate 3 and other requirements. A ratio of a light mixing distance to a spacing between two adjacent micro light emitting diodes may normally reflect a complete thickness of the backlight module as well as a quantity of the micro light emitting diodes used in the backlight module. A smaller ratio indicates a smaller light mixing distance and a smaller thickness; and larger spacing between two adjacent micro light emitting diodes indicates a smaller quantity of micro light emitting diodes used, which reduces the cost.

After the diffusing plate 3 is arranged on the supporting pillar 2, the optical film may further be arranged on a surface of the diffusing plate.

The optical film is arranged as a whole layer, and a shape thereof is substantially same as that of the micro light emitting diode light board 1, which may be set to be rectangular or square in general.

Through the arrangement of the optical film, the backlight module may adapt to various practical applications.

When the micro light emitting diodes 23 in the micro light emitting diode light board 1 are blue light micro light emitting diodes, the optical film includes a quantum dot layer or a fluorescent layer.

The quantum dot layer includes a red quantum dot material and a green quantum dot material. The red quantum dot material emits red light when being excited by blue light, the green quantum dot material emits green light when being excited by blue light, and the red light and green light emitted under excitement are mixed with transmitted blue light into white light to be emitted.

The fluorescent layer includes fluorescent materials emitting red light under excitement and emitting green light under excitement, and the red light and green light emitted under excitement are mixed with transmitted blue light into white light to be emitted.

In addition, the optical film may further include a prismatic lens. The prismatic lens may change an emitting angle of light, so a view angle of the display apparatus is changed.

The optical film may further include a reflective polarizer. The reflective polarizer, may increase a brightness of the backlight module, increase use efficiency of the light, and make the emitting light have polarizing properties, so a polarizer under the liquid crystal display panel may be omitted.

Figure 12:
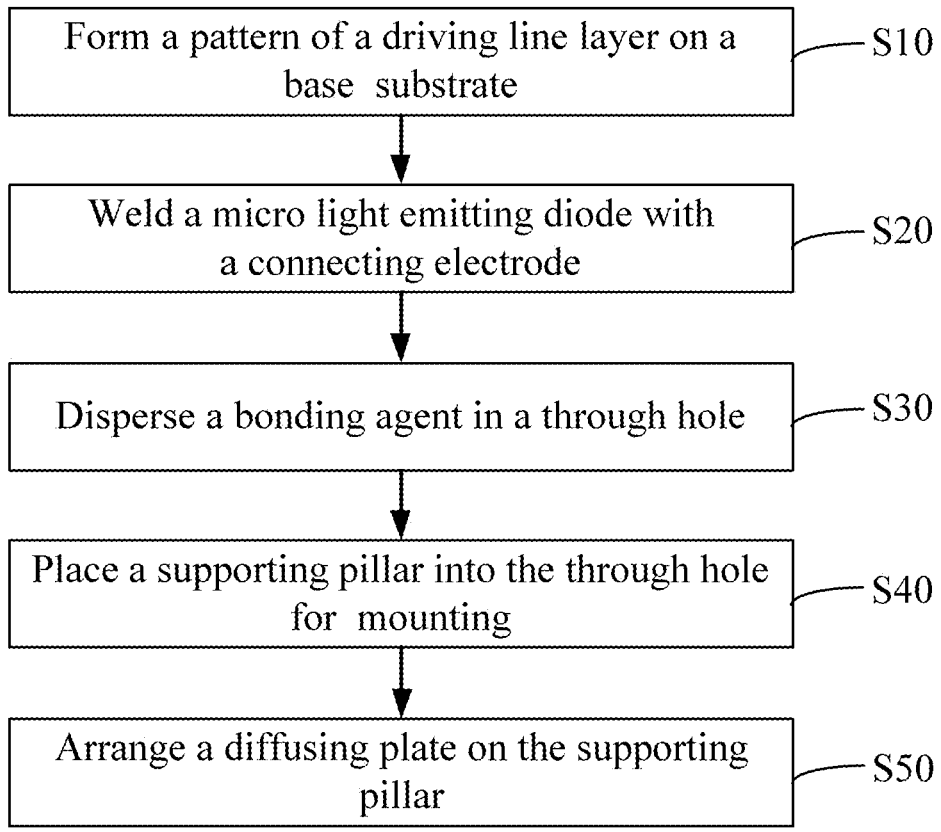
FIG. 12 is a schematic flow chart of a manufacturing method of a display apparatus according to an embodiment of the present application.

FIG. 12 is a schematic flow chart of a manufacturing method of a display apparatus according to an embodiment of the present application.

Referring to FIG. 12, the manufacturing method of the display apparatus according to the embodiment of the present application includes S10 to S50.

S10, a pattern of a driving line layer is formed on a base substrate. The driving line layer includes a through hole penetrating through the driving line layer and an exposed connecting electrode.

S20, a micro light emitting diode is welded with the connecting electrode.

S30, a bonding agent is dispersed in the through hole.

S40, a supporting pillar is placed into the through hole for mounting.

S50, a diffusing plate is arranged on the supporting pillar.

By arranging the through hole on the driving line layer of a micro light emitting diode light board, the through hole serves as an area for mounting the supporting pillar which supports the diffusing plate. The supporting pillar is directly mounting in the through hole and is fixed, and then the diffusing plate is arranged on the supporting pillar.

The through hole in the driving line layer may be formed by the same pattern process as film layers in the driving line layer, and cost and process difficulty will not be increased. Because the supporting pillar is fixed in the through hole, the base substrate is prevented from being punched with holes. In the meantime, a position of the through hole is fixed, so by inserting the supporting pillar into the through hole, relative movement of the supporting pillar may be avoided, thereby improving stability of a supporting structure.

In particular, when the pattern of the driving line layer is formed on the base substrate, a pattern of a gate metal layer is first formed on the base substrate.

When the pattern of the gate metal layer is formed on the base substrate, a metal layer is formed on the base substrate; a photoresist layer is formed on the metal layer; a mask is arranged on the photoresist layer, and the mask has a pattern in a region outside a gate, grating, and other signal lines; exposure and development is performed on the photoresist layer to expose a portion of the metal layer in addition to the required pattern; the exposed metal layer is etched; and the reserved photoresist layer is stripped to form the pattern of the gate metal layer.

The gate metal layer 221 may adopt a single layer or multiple layers of metal including Au, Ag, Cu, Ni, Pt, Al, Mo or Cr, or may adopt a metal layer of Al:Nd alloy or a Mo:W alloy.

Then, a pattern of a gate insulating layer is formed on a side of the gate metal layer facing away from the base substrate.

An insulating layer is formed on the gate metal layer; a photoresist layer is formed on the insulating layer; a mask is arranged on the photoresist layer, and the mask has a pattern in a region where a via hole is arranged; exposure and development is performed on the photoresist layer to expose the insulating layer in the region where the via hole is arranged; the exposed insulating layer is etched; and the reserved photoresist layer is stripped to form the pattern of the gate insulating layer. The pattern of the gate insulating layer includes the via hole configured to form the above through hole.

The gate insulating layer may be an inorganic layer of silicon oxide, silicon nitride, or metal oxide, and may include a single layer or multiple layers.

Then, patterns of a source layer and a source-drain metal layer are formed on a side of the gate insulating layer facing away from the gate metal layer.

A semiconductor layer is formed on the gate insulating layer and a metal layer is formed on the semiconductor layer; a photoresist layer is formed on the metal layer; a half-tone mask is arranged on the photoresist layer, wherein the half-tone mask includes a fully transmitting region, a semi-transmitting region and a light shielding region, the fully transmitting region corresponds to a region where no pattern exists in the source layer and the source-drain metal layer, the semi-transmitting region corresponds to a channel region of the source layer, and the light shielding region corresponds to a region where the source layer and the source-drain metal layer have patterns; exposure is performed on the photoresist layer to form a fully exposed region, a partially exposed region and a non-exposed region; photoresist is completely removed in the fully exposed region after developing, a photoresist layer with a relatively small thickness exists in the partially exposed region after developing, and a photoresist layer with a relatively large thickness exists in the non-exposed region after developing; the exposed metal layer and semiconductor layer are etched; ashing treatment is performed on photoresist in the partially exposed region, the photoresist layer in the region is removed, and the metal layer in the region is etched to expose the channel region; and the reserved photoresist layer is stripped to form the patterns of the source layer and the source-drain metal layer.

The source layer may adopt materials such as amorphous silicon or polycrystalline silicon. The source-drain metal layer may adopt a single layer or multiple layers of metal including Au, Ag, Cu, or Al, or may adopt a metal layer of Al:Cu alloy.

Then, patterns of flat layers are formed on sides of the source layer and the source-drain metal layer facing away from the gate insulating layer.

An insulating layer with a certain thickness is formed on the source layer and the source-drain metal layer respectively; a photoresist layer is formed on each insulating layer; a mask is arranged on each photoresist layer, and the mask has a pattern in a region where the via hole is arranged; exposure and development is performed on the photoresist layers to expose the insulating layers where the via hole is arranged; the exposed insulating layers are etched; and the reserved photoresist layers are stripped to form the patterns of the flat layers. The patterns of the flat layers include the via hole configured to form the above through hole.

The flat layers may adopt resin or an organic insulating material.

Patterns of connecting electrodes are formed on sides of the flat layers facing away from the source layer and the source-drain metal layer.

A conductive material layer is formed on each flat layer; a photoresist layer is formed on each conductive material layer; a mask is formed on each photoresist layer, and the masks have patterns in regions in addition to the connecting electrodes and the signal lines; exposure and development is performed on the photoresist layers to expose the conductive material layers in regions in addition to the connecting electrodes and the signal lines; the exposed conductive material layers are etched; and the reserved photoresist layers are stripped to form the patterns of the connecting electrodes and the signal lines.

The connecting electrodes may adopt a transparent conductive material such as indium tin oxide (ITO).

Then, shapes of reflective layers are formed on the sides of the flat layers facing away from the source layer and the source-drain metal layer.

A reflective material layer is formed on each flat layer; a photoresist layer is formed on each reflective material layer; a mask is arranged on each photoresist layer, and the mask has a pattern in a region where the via hole is arranged; exposure and development is performed on the photoresist layers to expose the reflective material layers where the via hole is arranged; the exposed reflective material layers are etched; and the reserved photoresist layers are stripped to form the patterns of the reflective layers. The patterns of the reflective layers include the via hole configured to form the above through hole.

The reflective layers may adopt materials with reflective properties such as white oil.

In this way, by forming the driving line layer through the above processes, and by adding a pattern of the through hole in the pattern process of each film layer, the through hole penetrating the gate insulating layer, the flat layers and the reflective layers is formed.

After the pattern of the driving line layer is formed, the micro light emitting diodes are transferred to an upper side of the driving line layer to be aligned with the connecting electrodes on the driving line layer, and then the micro light emitting diodes are welded with the corresponding connecting electrodes.

Then dispersing is performed in the through hole to form a bonding layer configured to bond the supporting pillar on the base substrate in the through hole.

In the embodiment of the present application, by manufacturing the through hole on the micro light emitting diode light board to fix the supporting pillar, automatic attaching of the supporting pillar may be realized.

In particular, a camera device such as CCD is adopted for positioning the micro light emitting diode light board and takes photos, and the photo image is used as a feature picture, position information of the through hole in the feature picture is captured as feature information, then the device is controlled to move to grasp the supporting pillar, and then the supporting pillar is transferred to a corresponding position to be released according to the position information of the through hole, so that the supporting pillar is inserted into the corresponding through hole, is in sufficient contact with the bonding layer in the through hole, and is bonded to the base substrate in the through hole.

After the supporting pillar is attached, the diffusing plate is arranged on the supporting pillar, and then an optical film is mounted. In this way, manufacturing of a backlight module in the display apparatus is realized.

Afterwards, a display panel is arranged on a light emitting side of the backlight module, and a manufacturing process of the display apparatus is completed.

Regarding how to realize support for a diffusing plate, the present application further provides a backlight module.

Figure 13:
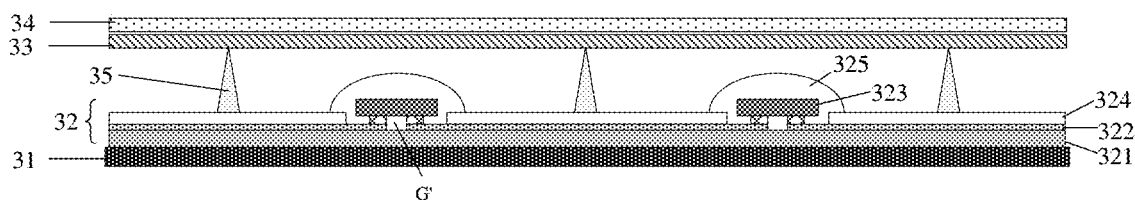
FIG. 13 is a first schematic sectional diagram of a backlight module according to an embodiment of the present application.

FIG. 13 is a first schematic sectional diagram of a backlight module according to an embodiment of the present application.

Referring to FIG. 13, the backlight module includes: a back plate 31, a micro light emitting diode light board 32, a diffusing plate 33, an optical film 34 and a diffusing plate bracket 35.

The back plate 31 is arranged at a bottom of the backlight module and has supporting and bearing functions. The back plate 31 is usually a rectangular structure. When it is applied to an abnormal shape display apparatus, its shape adapts to a shape of the display apparatus. The back plate 31 includes an upper side, a lower side, a left side and the right side.

A material of the back plate 31 includes aluminum, iron, aluminum alloy, or iron alloy. The back plate 31 is configured to fix the micro light emitting diode light board 32 as well as to support and fix edge areas of the diffusing plate 33, the optical film 34 or other components. The back plate 31 further has a heat dissipation function on the micro light emitting diode light board 32.

In the embodiment of the present application, the backlight module is the direct type backlight module, and the micro light emitting diode light board 32 is arranged on the back plate 31. In general, the micro light emitting diode light board 32 may be square or rectangular as a whole. When it is applied to the abnormal shape display apparatus, the shape and a size thereof adapt to the shape and a size of the display apparatus.

A plurality of micro light emitting diode light boards 32 may be arranged according to a size of the display apparatus, and the micro light emitting diode light boards 32 usually provide backlight through a splicing manner. In order to avoid an optical problem caused by splicing the micro light emitting diode light boards 32, a gap between adjacent micro light emitting diode light boards 32 is made as small as possible, or even seamless splicing is achieved.

The diffusing plate 33 is arranged on a light emitting side of the micro light emitting diode light board 32 and is at a certain distance from the micro light emitting diode light board 32. A shape of the diffusing plate 33 is substantially same as a shape of the micro light emitting diode light board 32. In general, the diffusing plate 33 may be arranged to be rectangular or square.

A function of the diffusing plate 33 is to diffuse the emitting light and make the light passing the diffusing plate 33 more uniform. A scattered particle material is in the diffusing plate 33, and the light entering the scattered particle material will be continuously refracted and reflected, so that an effect of diffusing the light is achieved and a function of light uniforming is realized.

A thickness of the diffusing plate 33 ranges from 1.5 mm to 3 mm. It usually has a large haze, with a better light uniform effect. It may usually be processed by an extrusion technology. A material of the diffusing plate 33 is usually selected from at least one of polymethyl methacrylate (PMMA), polycarbonate (PC), a polystyrene series material (PS), and polypropylene (PP).

Quantum dot materials may be further arranged in the diffusing plate 33 to form a quantum dot diffusing plate. The quantum dot materials include a red quantum dot material and a green quantum dot material. The red quantum dot material emits red light when being excited by blue light, the green quantum dot material emits green light when being excited by blue light, and the red light and green light emitted under excitement are mixed with transmitted blue light into white light to be emitted.

Through the arrangement of the quantum dot diffusing plate, in a subsequent process of manufacturing the backlight module, no quantum dot film is arranged, so cost is reduced while the display apparatus is lighter and thinner.

The optical film 34 is arranged on the side of the diffusing plate 33 facing away from the micro light emitting diode light board 32. The optical film 34 is arranged as a whole layer, and a shape thereof is substantially same as that of the micro light emitting diode light board 32, which may be configured to be rectangular or square in general.

Through the arrangement of the optical film 34, the backlight module may adapt to various practical applications.

In the embodiment of the present application, when blue micro light emitting diodes are adopted as a light source, the optical film 34 includes a quantum dot layer or a fluorescent layer.

The quantum dot layer includes a red quantum dot material and a green quantum dot material. The red quantum dot material emits red light when being excited by blue light, the green quantum dot material emits green light when being excited by blue light, and the red light and green light emitted under excitement are mixed with transmitted blue light into white light to be emitted.

The fluorescent layer includes fluorescent materials emitting red light under excitement and emitting green light under excitement, and the red light and green light emitted under excitement are mixed with transmitted blue light into white light to be emitted.

In addition, the optical film 34 may further include a prismatic lens. The prismatic lens may change an emitting angle of light, so a view angle of the display apparatus is changed.

The optical film 34 may further include a reflective polarizer. The reflective polarizer, may increase a brightness of the backlight module, increase use efficiency of the light, and make the emitting light have polarizing properties, so a polarizer under the liquid crystal display panel is omitted.

In order to prevent the diffusing plate from collapsing and deforming which may result in deterioration of optical properties of the backlight module and even damage to the light board, the diffusing plate bracket 35 is usually arranged in the backlight module to support the diffusing plate.

The diffusing plate bracket 35 is usually directly attached to the micro light emitting diode light board 32. When the micro light emitting diode light board 32 adopts a glass base substrate, external force applied on the diffusing plate 33 may be directly conducted to the micro light emitting diode light board 32 through the diffusing plate bracket 35, which will easily cause damage to the glass substrate.

Figure 14:
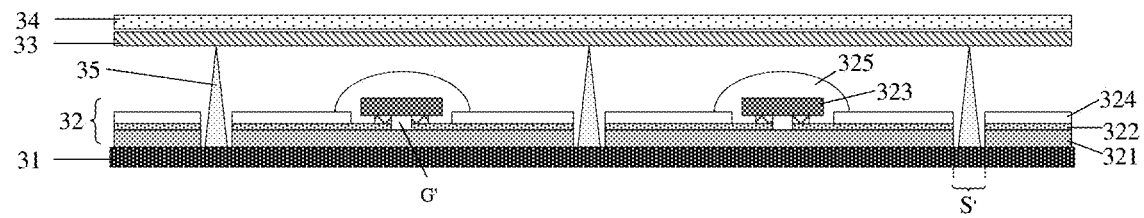
FIG. 14 is a second schematic sectional diagram of a backlight module according to an embodiment of the present application.

In view of this, an embodiment of the present application provides a display apparatus. FIG. 14 is a second schematic sectional diagram of a backlight module according to an embodiment of the present application.

Referring to FIG. 14, the micro light emitting diode light board 32 further includes a plurality of through holes S', and the diffusing plate bracket 35 is arranged in the through holes S' and is fixed on the back plate 31 exposed by the through holes S'. In this way, external force can be directly transmit to the back plate 31 by means of the diffusing plate bracket 35, thereby preventing application of the external force on the micro light emitting diode light board 32 and thus preventing damage of the light board.

In the embodiment of the present application, the diffusing plate bracket 35 may be bonded to the back plate 31 by bonding glue that has a bonding effect, or the diffusing plate bracket 35 may be directly welded on the back plate 31, or connection between the back plate 31 and the diffusing plate bracket is realized by mechanical manner such as buckling. A connection relation between the diffusing plate bracket 35 and the back plate 31 is not limited here.

Referring to FIG. 14, the micro light emitting diode light board 32 specifically includes: a base substrate 321, a line layer 322, micro light emitting diodes 323, a reflective layer 324, packaging layers 325 and through holes S'.

The base substrate 321 is arranged on the back plate 31, a shape of the base substrate 321 is substantially same as an overall shape of the micro light emitting diode light board 32. In general, the base substrate 321 is in a plate shape, and is rectangular or square as a whole. In the embodiment of the present application, a material of the base substrate 321 is glass with a relatively high thermal conductivity coefficient. By manufacturing the base substrate 321 with the glass with the relatively high thermal conductivity coefficient, heat emitted by the display apparatus during display may be dissipated quickly, so a problem of lowering a light emitting efficiency caused by an excessively high temperature is avoided. In addition, the glass substrate has a smooth and flat surface, which allows for easing subsequent processing and manufacturing.

The line layer 322 according to the embodiment of the present application is deposed on the base substrate 321 by electroplating through a conductive material, and lines are formed by etching according to needs. The conductive material may be copper, which is not limited here. As shown in FIG. 14, the conductive material will etch a fracture G', and two sides of the fracture G' are respectively connected with positive electrode and negative electrode of the micro light emitting diodes 323.

The micro light emitting diodes 323 are arranged on the line layer 322. After the line layer 322 is manufactured, bonding pads to be welded with the micro light emitting diodes 323 will be formed on a surface thereof, and the micro light emitting diodes 323 are welded with the bonding pads, so that the micro light emitting diodes 323 are driven to emit light by controlling driving signals of the line layer 322.

The micro light emitting diodes 323 are not like conventional light emitting diodes, and specifically refer to micro light emitting diode chips. The micro light emitting diodes 323 are very small in size, which contributes to controlling dynamic light emission of the backlight module to smaller scales and improving contrast of a screen. In the embodiment of the present application, the micro light emitting diodes 323 may adopt various sizes. For example, a size of a micro light emitting diode 323 is smaller than 1 mm. The micro light emitting diodes may be manufactured based on corresponding sizes according to practical application, which is not limited herein.

The micro light emitting diode light board 32 may include micro light emitting diodes 323 of only one color, or may include micro light emitting diodes 323 of multiple colors, which is not limited herein.

The reflective layer 324 is arranged on a surface of a side of the line layer 322 close to the micro light emitting diodes 323, serves as an insulating protective layer, and has an effect of protecting a circuit board. In the embodiment of the present application, as the reflective layer 324, a material with a reflective property coats the surface of the line layer 322, and then positions of the bonding pads configured to be welded with the micro light emitting diodes 323 are then exposed through processes such as etching, so as to form holes configured to expose the micro light emitting diodes 323.

A material of the reflective layer 324 is white ink with light reflecting property, so light emitted from a micro light emitting diode lamp 123 to a side of the micro light emitting diode light board 32 or light reflected by the diffusing plate 33 and the optical film 34 back to the micro light emitting diode light board 32 may be reflected by the reflective layer 324 to a light emitting side again, thus improving use efficiency of a light source. A thickness of the white ink is 20 μm-50 μm, and with a reflection rate of 95% or so, has good reflecting property.

The packaging layers 325 are protective glue covering surfaces of sides of the micro light emitting diodes 323 facing away from the line layer 322. The packaging layers 325 are configured to protect the micro light emitting diodes 323 through packaging and to prevent foreign items from entering into insides of the micro light emitting diodes 323. In the embodiment of the present application, the packaging layers 325 may adopt a transparent colloid material, such as silicon gel or epoxy resin, which are relatively good transparency. The packaging layers 325 in the embodiment of the present application are in one-to-one correspondence with the micro light emitting diodes 323, and are manufactured by dispersing, which saves cost.

Figure 15:
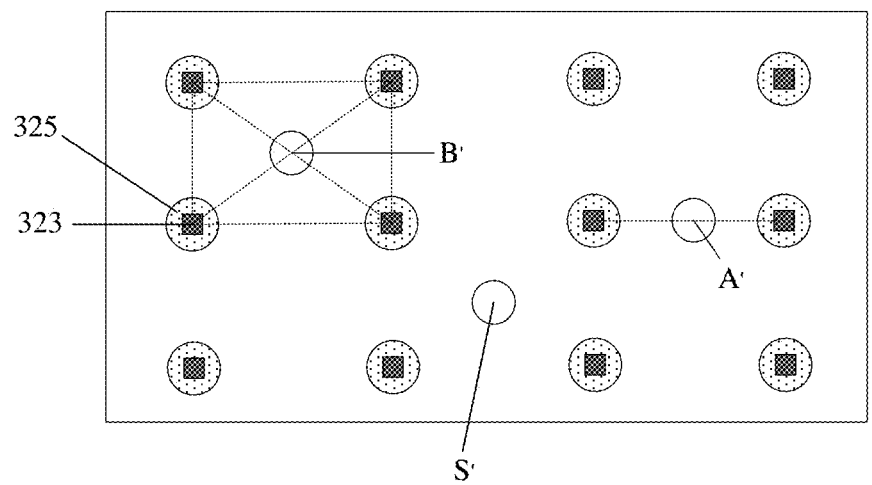
FIG. 15 is a top view of a micro light emitting diode light board according to an embodiment of the present application.

FIG. 15 is a top view of a micro light emitting diode light board according to an embodiment of the present application.

Referring to FIG. 15, an arranged position of the through holes S' is a position of the diffusing plate bracket 35. In order to avoid the micro light emitting diodes 323 and prevent the diffusing plate bracket 35 from blocking light emitting from the micro light emitting diodes 323, the through holes S' may be arranged at positions A between every two adjacent micro light emitting diodes 323, or the diffusing plate bracket 35 may be arranged at a central position B' of quadrangles constituted by every four adjacent micro light emitting diodes 323.

A material of the diffusing plate bracket 35 is usually transparent polycarbonate (PC). During specific implementation, a shape of the diffusing plate bracket 35 may be a triangle, a trapezoid, a cone, etc. in a simple form, which is not limited here.

Figure 16:
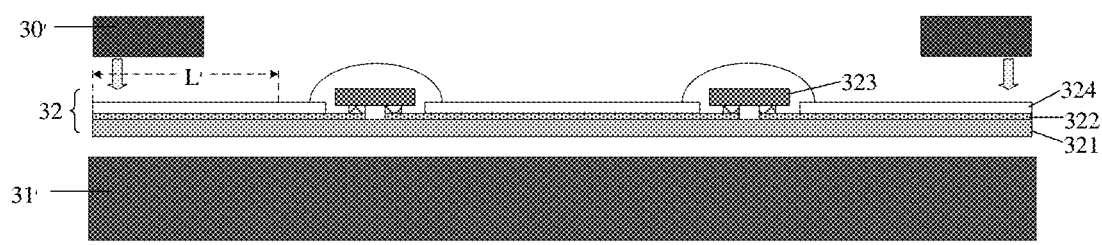
FIG. 16 is a schematic sectional diagram of a micro light emitting diode light board manufactured in the related art.

FIG. 16 is a schematic sectional diagram of a micro light emitting diode light board manufactured in related art.

Referring to FIG. 16, in the related art, in a design and processing process of a micro light emitting diode light board, in order to fix a base substrate, it is generally necessary to preserve a process edge of a certain size in a base substrate design process, and after processing is completed, the process edge is cut away. As shown in FIG. 16, the size L' of the process edge usually exceed 5 mm, and when a base substrate is fixed, a clamp 30' needs to be used to clamp an area of the process edge so as to mount the base substrate on a bearing platform 31'. Such a mounting manner is prone to crushing a glass base substrate, affecting a processing yield, adding the process edge and increasing cost of the base substrate.

Figure 17:
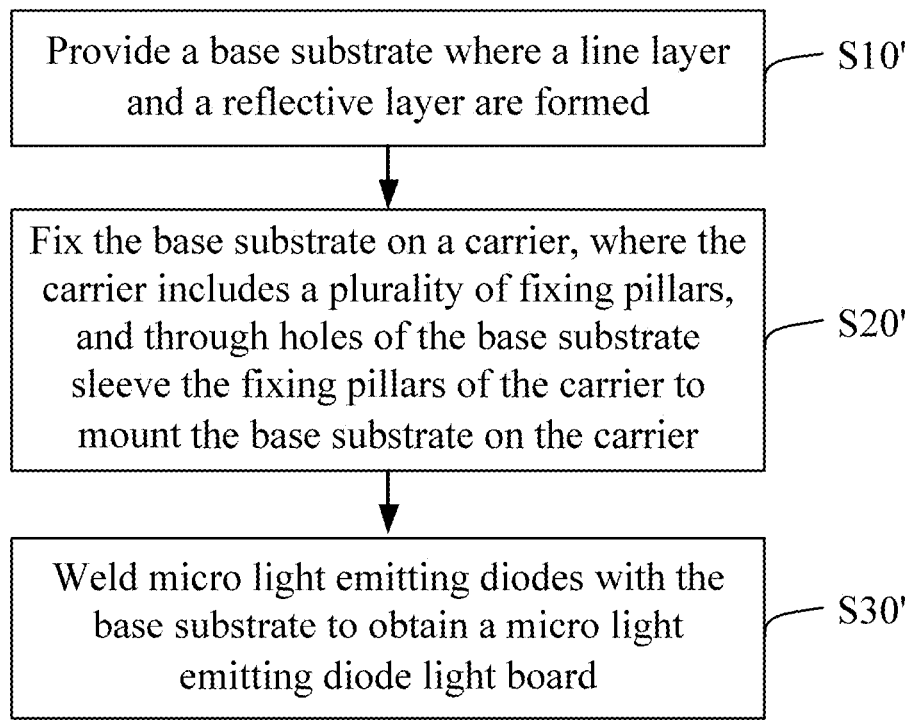
FIG. 17 is a schematic diagram of a process of manufacturing a micro light emitting diode light board according to an embodiment of the present application.

In view of this, an embodiment of the present application provides a manufacturing method of a micro light emitting diode light board. As shown in FIG. 17, the manufacturing method includes: S10' to S30'.

S10', a base substrate where a line layer and a reflective layer are formed is provided. The base substrate includes a plurality of through holes penetrating through the base substrate, the line layer and the reflective layer.

S20', the base substrate is fixed on a carrier, where the carrier includes a plurality of fixing pillars, and the through holes of the base substrate sleeve the fixing pillars of the carrier to mount the base substrate on the carrier.

S30', micro light emitting diodes are welded with the base substrate to obtain the micro light emitting diode light board.

According to the manufacturing method of the micro light emitting diode light board, the base substrate where the line layer and the reflective layer is provided first, the base substrate includes the plurality of through holes penetrating through the base substrate, the line layer and the reflective layer, and the reflective layer further includes a plurality of openings of bonding pads configured to expose the micro light emitting diodes; then, the carrier configured to manufacture the micro light emitting diode light board is provided, and the carrier includes the plurality of fixing pillars; the base substrate is fixed on the carrier, and the through holes of the base substrate sleeve the fixing pillars of the carrier, so that the base substrate is fixed on the carrier; solder paste is printed on the bonding pads exposed by the reflective layer and configured to be welded with the micro light emitting diodes, and the micro light emitting diodes are placed on the bonding pads printed with the solder paste; and then the base substrate where the micro light emitting diodes are placed is subjected to high-temperature heating in a reflow furnace, the solder paste is melted and then solidified, the micro light emitting diodes are welded with the base substrate, and protective glue is dispersed on surfaces of the micro light emitting diodes to form the packaging layers, thereby completing manufacturing of the micro light emitting diode light board.

Figure 18:
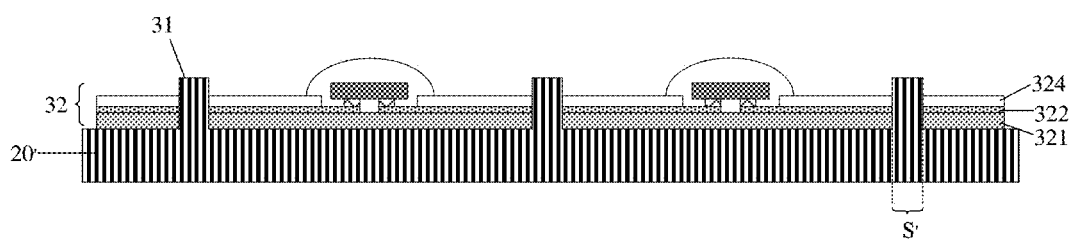
FIG. 18 is a schematic sectional diagram of a micro light emitting diode light board being manufactured according to an embodiment of the present application.

FIG. 18 is a schematic sectional diagram of a micro light emitting diode light board during manufacture according to an embodiment of the present application.

Referring to FIG. 18, the quantity of the fixing columns 21 of the carrier 20' according to the embodiment of the present application is equal to or smaller than the quantity of the through holes S', and the fixing pillars 21 correspond to positions of the through holes S', so it is ensured that the fixing pillars 21 penetrate through the corresponding through holes S', thereby fixing the base substrate. By manufacturing the micro light emitting diode light board through such fixing manner, addition of a process edge is avoided, cost is lowered, and a problem that a glass substrate is prone to damage caused by a fixing manner of adopting a clamp is avoided.

According to the embodiments of the present application, the through holes are arranged on the base substrate, and they may serve as positioning holes for fixing when the micro light emitting diode light board is manufactured in a processing procedure, and may serve as holes for a diffusing plate bracket in a mounting stage of a backlight module. In this way, in manufacture process of the micro light emitting diode light board, addition of the process edge is avoided, the cost is lowered, and the problem that the glass substrate is prone to damage caused by the fixing manner of adopting the clamp is avoided. Particularly for a glass substrate, in the mounting stage of the backlight module, external force may be conveyed to the back plate through a diffusing plate bracket, so a problem that the diffusing plate bracket is arranged on the glass substrate, the external force is conveyed to the glass substrate through the diffusing plate bracket, and damage to the glass substrate is caused may be avoided.

Those skilled in the art can make various changes and modifications to the present application without departing from the spirit and scope of the present application. Thus, these changes and modifications of the present application shall fall within the scope of the claims of the present application.

What is claimed is:

1. A display apparatus, comprising:
   a display panel, configured for displaying an image; and
   a backlight module, arranged on a side of the display panel, and configured to provide backlight for the display panel; wherein
   the backlight module comprises:
   a back plate, having a support function;
   a micro light emitting diode light board, arranged on a side of the back plate and configured to be a backlight source; wherein the micro light emitting diode light board comprises a plurality of micro light emitting diodes and a plurality of through holes; and
   a diffusing plate bracket, configured to be placed in the plurality of through holes, fixed on the back plate exposed by the plurality of through holes, and making no contact with the micro light emitting diode light board;
   wherein the micro light emitting diode light board comprises:
   a base substrate, arranged on the back plate;
   a line layer, arranged on a side of the base substrate away from the back plate, and configured to provide a driving signal;
   the plurality of micro light emitting diodes, arranged on the line layer;
   a reflective layer, arranged on a side of the line layer close to the plurality of micro light emitting diodes, wherein the reflective layer comprises a plurality of openings configured to expose the plurality of micro light emitting diodes, one opening of the plurality of openings is used to expose one micro light emitting diode of the plurality of micro light emitting diodes; and
   a packaging layer, arranged on a plurality of surfaces corresponding to the plurality of micro light emitting diodes, and configured to protect the plurality of micro light emitting diodes, wherein the packaging layer comprises a dot pattern in one-to-one correspondence to the plurality of micro light emitting diodes;
   wherein the through holes are configured to penetrate through the base substrate, the line layer and the reflective layer.

2. The display apparatus according to claim 1, wherein the through holes are arranged at areas between two adjacent micro light emitting diodes.

3. The display apparatus according to claim 1, wherein the through holes are arranged at central areas of a quadrangle formed by four adjacent micro light emitting diodes, wherein each two of the four adjacent micro light emitting diodes are adjacent.

4. The display apparatus according to claim 1, wherein a shape of a through hole is circular or square.

5. The display apparatus according to claim 1, wherein a material of the base substrate is glass.

6. The display apparatus according to claim 1, wherein a material of the reflective layer is white ink.

7. The display apparatus according to claim 6, wherein a thickness of the white ink is configured to be from 20 μm to 50 μm.

8. The display apparatus according to claim 1, wherein a size of a micro light emitting diode of the plurality of micro light emitting diodes is smaller than 1 mm.

9. The display apparatus according to claim 1, wherein the backlight module further comprises:
   a diffusing plate, arranged on a side of the micro light emitting diode light board away from the back plate, wherein the diffusing plate bracket is configured to support the diffusing plate; and
   an optical film, arranged on a side of the diffusing plate away from the micro light emitting diode light board.

* * * * *